(12) United States Patent
Ikenoue

(10) Patent No.: US 8,271,497 B2
(45) Date of Patent: Sep. 18, 2012

(54) INFORMATION PROCESSING APPARATUS AND INFORMATION PROCESSING METHOD OUTPUTTING INFORMATION ON MOVEMENT OF PERSON

(75) Inventor: Shoichi Ikenoue, Chiba (JP)

(73) Assignee: Sony Computer Entertainment Inc., Tokyo (JP)

( * ) Notice: Subject to any disclaimer, the term of this patent is extended or adjusted under 35 U.S.C. 154(b) by 140 days.

(21) Appl. No.: 12/870,087

(22) Filed: Aug. 27, 2010

(65) Prior Publication Data

US 2011/0137907 A1 Jun. 9, 2011

(30) Foreign Application Priority Data

Dec. 3, 2009 (JP) ................... 2009-275163
Dec. 3, 2009 (JP) ................... 2009-275164
Dec. 3, 2009 (JP) ................... 2009-275165
Dec. 3, 2009 (JP) ................... 2009-275166

(51) Int. Cl.
*G06F 17/30* (2006.01)

(52) U.S. Cl. ........ 707/740; 707/748; 701/426; 701/450; 701/521; 701/532

(58) Field of Classification Search .......... 707/740, 707/748; 705/13; 340/995.13, 995.21, 995.24, 340/572.1; 701/532, 414, 426, 439, 118, 701/521, 450; 455/436; 725/26; 709/219
See application file for complete search history.

(56) References Cited

U.S. PATENT DOCUMENTS 7,127,413 B1 * 10/2006 Yanagisawa et al. ........... 705/13
7,379,812 B2 * 5/2008 Yoshioka et al. ............. 701/426
7,630,828 B2 * 12/2009 Tajima et al. ................. 701/118
8,065,072 B2 * 11/2011 Yoshioka et al. ............. 701/117
2005/0086100 A1 * 4/2005 Yanagisawa et al. .......... 705/13
2007/0198184 A1 * 8/2007 Yoshioka et al. ............. 701/211

(Continued)

FOREIGN PATENT DOCUMENTS

JP 2001-51840 2/2001

(Continued)

OTHER PUBLICATIONS

Japanese Notification of Reason(s) for Refusal, dated Nov. 22, 2011, for Japanese Patent Application No. 2009-275166.

(Continued)

*Primary Examiner* — Jean M Corrielus
(74) *Attorney, Agent, or Firm* — Katten Muchin Rosenman LLP

(57) ABSTRACT

In a position history analysis unit for analyzing a position history to acquire movement history information such as places of stay, a speed history computation unit refers to the position history to determine a speed occurring at each point of time and to obtain a speed history. A categorization unit organizes a time axis in the position history, and, ultimately, data for position coordinates occurring at respective points of time, into segments of stay and segments of movement, by checking the speed history against a threshold value. A merge unit detects segments of stay which occur at different points of time but which are identified as indicating stays in the same place, by feeding the time flow, categorized into segments of stay and segments of movement by the categorization unit based on the speed, back to the position coordinates in the respective segments. The merge unit merges the segments of stay as needed. An information generation unit evaluates a set of position coordinates and speed values in each segment of stay and in each segment of movement thus obtained and derives predetermined information on each segment.

14 Claims, 18 Drawing Sheets

U.S. PATENT DOCUMENTS

| | | | | |
|---|---|---|---|---|
| 2009/0105934 | A1* | 4/2009 | Tajima et al. | 701/118 |
| 2009/0281721 | A1* | 11/2009 | Yoshioka et al. | 701/207 |
| 2009/0312946 | A1* | 12/2009 | Yoshioka et al. | 701/208 |
| 2010/0217672 | A1* | 8/2010 | Maeno | 705/14.58 |
| 2010/0293255 | A1* | 11/2010 | Hara et al. | 709/219 |
| 2011/0202961 | A1* | 8/2011 | Asano | 725/46 |
| 2011/0244859 | A1* | 10/2011 | Tsuda | 455/436 |
| 2012/0084298 | A1* | 4/2012 | Suzuno | 707/748 |

FOREIGN PATENT DOCUMENTS

| | | |
|---|---|---|
| JP | 2003-288004 | 10/2003 |
| JP | 2004-139579 | 5/2004 |
| JP | 2005128005 | 5/2005 |
| JP | 2005269011 | 9/2005 |
| JP | 2006-170653 | 6/2006 |
| JP | 200779866 | 3/2007 |
| JP | 2007-156849 | 6/2007 |
| JP | 2008107916 | 5/2008 |
| JP | 2008-276668 | 11/2008 |
| JP | 2009-80794 | 4/2009 |
| JP | 2009-169173 | 7/2009 |
| JP | 2009237243 | 10/2009 |
| WO | 2009/011035 | 1/2009 |
| WO | 2009/016833 | 2/2009 |

OTHER PUBLICATIONS

Ayako Kuno, et al. "Platform for Associating Personal Contents with Place" Information Processing Society of Japan Technical Report, UBI (Ubiquitous Computing System), Nov. 29, 2007, pp. 9-14.

Notification of Reason(s) for Refusal dated Jul. 26, 2011, from the corresponding Japanese Patent Application No. 2009-275163.

Ayako Kuno, et. al., "Platform for Associating Personal Contents with Place" IPSJ SIG Technical Report, Japan, Information Processing Society of Japan (IPSJ), Nov. 29, 2007, vol. 2007, No. 118, p. 9-14, with English-language abstract.

Masakatsu Aoki, et. al., An estimating method for activity modes using location data, IPSJ SIG Technical Report, Japan, Information Processing Society of Japan (IPSJ), Jul. 17, 2008, vol. 2008, No. 70, p. 7-12, with English-language abstract.

Arisa Ooba, et. al., A method for information design of the website along "The image of the city", human interface, Japan, Human Interface Society, Nov. 21, 2006, vol. 8, No. 4, p. 43-48, with English-language abstract.

Notification of Reason(s) for Refusal dated Jul. 26, 2011, from the corresponding Japanese Patent Application No. 2009-275164.

Jun Ishizuka, et. al., Efficient Similarity Search for Trajectory Data, FIT 2005, 4th Forum on Information Technology, vol. 2, database, natural languages, artificial intelligence and games, audio and music, biological information science, Information Processing Society of Japan, Aug. 22, 2005, p. 39-40, with English-language abstract.

Notification of Reason(s) for Refusal dated Jan. 31, 2012, from corresponding Japanese Application No. 2009-275165.

Notification of Reason(s) for Refusal dated Jan. 31, 2012, from corresponding Japanese Application No. 2009-275164.

* cited by examiner

—— MOVEMENT
·········· 1st STAY
—·—·— 2nd STAY
—··—··— 3rd STAY

INFORMATION PROCESSING APPARATUS AND INFORMATION PROCESSING METHOD OUTPUTTING INFORMATION ON MOVEMENT OF PERSON

BACKGROUND OF THE INVENTION

1. Field of the Invention

The present invention relates to an information processing technology and, more particularly, to an information processing apparatus adapted to provide information using position information on a person and to an information processing method implemented in the apparatus.

2. Description of the Related Art

Various services utilizing position information obtained from a global positioning system (GPS) are currently available in car navigation systems, cell phones, etc. For example, devices are provided capable of mapping a history of user positions into a map and displaying the map accordingly. There is also proposed a technology designed to analyze a history of movement to keep track of the tendency in user behavior. For example, there is proposed a method designed to introduce the concept of "place" with a certain expanse by clustering a history of movement using the k-means method (see, for example, "Platform for mapping personal contents into places" Information Processing Society of Japan Technical Report, UBI, [ubiquitous computing system], 2007(118) pp. 9-14, 20071129).

Meanwhile, as a result of speeding up of image processing, advances in network environments, etc., information devices such as personal computers and cell phones are now equipped with the capabilities of displaying a map retrieved over a network. By configuring the capabilities of displaying a map as an interactive function, users can change the scale of the map or move the display area in a display screen of a limited size, so as to display a desired area.

In cameras and photo viewer devices, slideshow functions capable of displaying photos with switching automatically are now commonly available. Automatic switching between images for view requires automatically selecting an arbitrary number of images from a set of image data in order to adjust viewing time. For this purpose, technologies designed to select photos according to the time of photographing, similarity of images, etc. are proposed (e.g., JP 2009-80794).

Using a history of movement in which the position information such as latitude and longitude obtained from a GPS is merely mapped into the time of day (e.g., mapping the history into a geographical map) makes available information indicating a route of movement. However, it does not suit the purpose of understanding the tendency because all data are equally dealt with. The related-art approach also tends to produce an enormous amount of data and may create a problem in that an image as displayed is complicated and is less easily searchable. The above-mentioned technology using clustering extracts information on "places" indeed but does not make available relation with a time axis (e.g., time spent in stay, frequency of stay, etc.). The related-art approach also categorizes data into "stay" and "movement" according to the speed of movement. Therefore, places of stay such as amusement parks and golf links where people move as they use the place are less likely to be extracted.

Further, users using the above-mentioned map displaying function and wishing to view a desired area at a desired scale have to adjust both the area in view and the scale while viewing the screen. Quite often, this could result in an area different from the intended area being displayed as the scale is increased, or the desired area being lost from view.

In particular, where network connection is established to download image data for a map, various processes for displaying a new image are required each time the user makes fine adjustment, requiring a certain period of time before a new image is displayed since the user operation. Depending on the processing capabilities of the device or network conditions, the time elapsed would be intolerable, causing stress for the user.

Further, where photos are used to, for example, recollect a trip, it is desirable to select photos that match individual scenes. If the focus is only on a series of photos taken by the user and photos are selected for display accordingly, selection of photos may be biased because little photos may have been taken in one scene and a lot of photos may have been taken in another, resulting in discrepancy between the result of displaying photos and the actual trip.

Related Art List

"Platform for mapping personal contents into places" Information Processing Society of Japan Technical Report, UBI, [ubiquitous computing system], 2007(118) pp. 9-14, 20071129.

JPA laid open 2009-80794

SUMMARY OF THE INVENTION

The present invention addresses the aforementioned issues and a purpose thereof is to provide an information processing technology capable of efficiently extracting useful information using time-dependent history of position information. Another purpose is to provide a technology capable of easily arriving at a user-preferred scale of a map as displayed or a user-preferred display area therein. Still another purpose is to provide a technology adapted for a mode where contents selected from a plurality of contents are successively output and capable of output the selected contents in a balanced manner.

One embodiment of the present invention relates to an information processing apparatus. The information processing apparatus comprises: a categorization unit configured to determine time-dependent change of a parameter indicating a speed by referring to a position history containing a record of position coordinates of a subject recorded in association with time, and to organize a time axis into a segment of stay and a segment of movement by extracting, as a period of stay, a time period when the speed of the subject is below a predetermined speed threshold value for a period of time equal to or more than a predetermined duration threshold value; a place of stay identification unit configured to identify a plurality of segments of stay identified as indicating stays at the same place, by referring to a plurality of segments of stay identified by the categorization unit and detecting those segments of stay where the distribution of position coordinates in one segment of stay overlaps the distribution of position coordinates in the other segments of stay, sharing a predetermined portion of respective areas or larger, and also configured to identify positions of places of stay corresponding to the segments of stay by referring to the distribution of position coordinates; a movement history generation unit configured to generate movement history information that maps the positions of the places of stay identified by the place of stay identification unit into the corresponding segments of stay on the time axis; and a behavioral information generation unit configured to visualize the movement history information generated by the movement history information generation unit.

Another embodiment of the present invention relates to an information processing method. The information processing method comprises: reading from a memory a position history containing a record of position coordinates of a subject recorded in association with time so as to determine time-dependent change of a parameter indicating a speed; referring to the change in the speed and organizing a time axis into a segment of stay and a segment of movement by extracting, as a period of stay, a time period when the speed of the subject is below a predetermined speed threshold value for a period of time equal to or more than a predetermined duration threshold value; identifying a plurality of segments of stay identified as indicating stays at the same place, by referring to a plurality of segments of stay and detecting those segments of stay where the distribution of position coordinates in one segment of stay overlaps the distribution of position coordinates in the other segments of stay, sharing a predetermined portion of respective areas or larger, and also identifying positions of places of stay corresponding to segments of stay by referring to the distribution of position coordinates; generating movement history information that maps identified the positions of the places of stay into the corresponding segments of stay on the time axis, and storing the information in a memory; and visualizing the movement history information and outputting the visualized information to an output device.

Still another embodiment of the present invention relates to an information processing apparatus. The information processing apparatus comprises: a categorization unit configured to determine time-dependent change of a parameter indicating a speed by referring to a position history containing a record of position coordinates of a subject recorded in association with time, and to organize a time axis into a segment of stay and a segment of movement by extracting, as a period of stay, a time period when the speed of the subject is below a predetermined speed threshold value for a period of time equal to or more than a predetermined duration threshold value; a place of stay identification unit configured to identify positions of places of stay corresponding to a plurality of segments of stay identified by the categorization unit, by referring to the distribution of position coordinates in the segments of stay; a movement history generation unit configured to generate movement history information that maps the positions of the places of stay identified by the place of stay identification unit into the corresponding segments of stay on the time axis, and to store the information in a movement history storage; a search unit configured to use information related to a place as a search key and to search a plurality of items of movement history information stored in the movement history storage for the movement history information that matches a condition derived from the search key; and a behavioral information generation unit configured to visualize the movement history information extracted by the search unit as a search result in a predetermined format.

The search unit may acknowledge information related to a position as a search key from a user or another functional module, and extract the movement history information that includes the position in a place of stay, and the behavioral information generation unit may display on a figure showing geography a position of the place of stay and a movement route connecting the position coordinates recorded in the segment of movement included in the extracted movement history information.

The search unit may display on a display device the figure showing geography and a graphic form that the user can move on the figure, and, when an input for confirming a position of the graphic form is provided, extract the movement history that includes the place of stay located within the graphic form.

The search unit may acknowledge information related to a position as a search key from a user or another functional module, and extract the movement history information that includes the position in a place of stay, and the behavioral information generation unit may display a diagram representing a distribution of places of stay included in the extracted movement history information using at least one of a graphic form and color.

The movement history generation unit may store in the movement history storage the movement history information, mapping the movement history information into information indicating a situation in which the position history originating the movement history information was recorded, and the search unit may narrow down the movement history information subject to search, by acknowledging the information indicating the situation via the user or another function module prior to the search using the search key related to a place and thereby specifying relevant movement history information.

The movement history generation unit may map, as the information indicating the situation, image or sound data acquired when the position history was recorded into the movement history information.

Yet another embodiment of the present invention relates to an information provider system. The information provider system includes an information processing apparatus operated by a user and a server connected to the apparatus via a network, wherein the information processing apparatus comprises: a categorization unit configured to determine time-dependent change of a parameter indicating a speed by referring to a position history containing a record of position coordinates of a subject recorded in association with time, and to organize a time axis into a segment of stay and a segment of movement by extracting, as a period of stay, a time period when the speed of the subject is below a predetermined speed threshold value for a period of time equal to or more than a predetermined duration threshold value; a place of stay identification unit configured to identify positions of places of stay corresponding to a plurality of segments of stay identified by the categorization unit, by referring to the distribution of position coordinates in the segments of stay; a movement history generation unit configured to generate movement history information that maps the positions of the places of stay identified by the place of stay identification unit into the corresponding segments of stay on the time axis, and to transmit the information to the server; a database generation unit configured to acquire a plurality of items of movement history information from a plurality of information processing apparatuses and to build a database of the movement history information; a search unit configured to use the movement history information transmitted from the information processing apparatus as a search key and to search the database for the movement history information that matches a condition derived from the search key; and a transmission unit configured to transmit the movement history information extracted by the search unit as a search result to the information processing apparatus in a predetermined format.

The search unit may extract, from the database and as a search result, a place which is located in an area of a predetermined range including the place of stay in the movement history information transmitted from the information processing apparatus as a search key, which is not the place of stay in the movement history information, and which is the place of stay in the movement history information for a different subject.

The search unit may acknowledge, in addition to the movement history information, information indicating a situation in which the position history originating the movement history information was recorded from the information processing apparatus, and extract the movement history information occurring in the same situation by identifying in the database the movement history information relevant to the situation.

Still another embodiment of the present invention relates to an information processing method. The information processing method comprises: reading from a memory a position history containing a record of position coordinates of a subject recorded in association with time so as to determine time-dependent change of a parameter indicating a speed; referring to the change in the speed and organizing a time axis into a segment of stay and a segment of movement by extracting, as a period of stay, a time period when the speed of the subject is below a predetermined speed threshold value for a period of time equal to or more than a predetermined duration threshold value; identifying positions of places of stay corresponding to a plurality of identified segments of stay, by referring to the distribution of position coordinates in the segments of stay; generating movement history information that maps the identified positions of the places of stay into the corresponding segments of stay on the time axis, and storing the information in a storage; using information related to a place as a search key and searching a plurality of items of movement history information stored in the storage for the movement history information that matches a condition derived from the search key; and visualizing the movement history information extracted as a search result and in a predetermined format and outputting the visualized information to an output device.

Still another embodiment of the present invention relates to a computer program embedded in a computer readable medium. The computer program embedded in a computer readable medium comprises a module configured to read from a memory a position history containing a record of position coordinates of a subject recorded in association with time so as to determine time-dependent change of a parameter indicating a speed; a module configured to refer to the change in the speed and organize a time axis into a segment of stay and a segment of movement by extracting, as a period of stay, a time period when the speed of the subject is below a predetermined speed threshold value for a period of time equal to or more than a predetermined duration threshold value; a module configured to identify positions of places of stay corresponding to a plurality of identified segments of stay, by referring to the distribution of position coordinates in the segments of stay; a module configured to generate movement history information that maps the identified positions of the places of stay into the corresponding segments of stay on the time axis, and to store the information in a storage; a module configured to use information related to a place as a search key and searching a plurality of items of movement history information stored in the storage for the movement history information that matches a condition derived from the search key; and a module configured to visualize the movement history information extracted as a search result and in a predetermined format and to output the visualized information to an output device.

Still another embodiment of the present invention relates to a computer readable recording medium having embedded therein a computer program. The computer readable recording medium has embedded therein a computer program comprising: a module configured to read from a memory a position history containing a record of position coordinates of a subject recorded in association with time so as to determine time-dependent change of a parameter indicating a speed; a module configured to refer to the change in the speed and organize a time axis into a segment of stay and a segment of movement by extracting, as a period of stay, a time period when the speed of the subject is below a predetermined speed threshold value for a period of time equal to or more than a predetermined duration threshold value; a module configured to identify positions of places of stay corresponding to a plurality of identified segments of stay, by referring to the distribution of position coordinates in the segments of stay; a module configured to generate movement history information that maps the identified positions of the places of stay into the corresponding segments of stay on the time axis, and to store the information in a storage; a module configured to use information related to a place as a search key and searching a plurality of items of movement history information stored in the storage for the movement history information that matches a condition derived from the search key; and a module configured to visualize the movement history information extracted as a search result and in a predetermined format and to output the visualized information to an output device.

Yet another embodiment of the present invention relates to an information processing apparatus. The information processing apparatus is adapted to output a display image showing a plurality of discretely defined geographical points on a map, and comprises: a dendrogram generation unit configured to create a dendrogram by acquiring position information of the geographical points and forming clusters using hierarchical clustering; a screen configuration determination unit configured to determine a scale and a display area of a plurality of maps for displaying the clusters such that the plurality of maps correspond to a plurality of levels of a hierarchy of the dendrogram created by the dendrogram generation unit; a display image generation unit configured to acquire necessary map data based on the scale and the display area of the map determined by the screen configuration determination unit and to generate data for a display image showing positions of the clusters using graphic forms on each map; and a display image switching unit configured to switch the display image for output, in accordance with a user's command input for switching the level of the hierarchy.

The screen configuration determination unit may determine the level of the hierarchy in the dendrogram that the display image should be mapped into, based on the maximum number of clusters to be displayed at a time, the maximum number being given as a restraint condition.

The screen configuration determination unit may determine the scale and the display area of the map based on a range of area capable of displaying the clusters in a screen, the range being given as a restraint condition.

The display image switching unit may acknowledge a user input for selecting one of the graphic forms representing the positions of clusters in the image being displayed, and switch to the display image showing the clusters in a layer underlying the selected cluster.

The display image generation unit may generate the data for the display image corresponding to the clusters in the respective level of the hierarchy, independently of the user's command input for switching the level.

The information processing apparatus may further comprise: a categorization unit configured to determine time-dependent change of a parameter indicating a speed by referring to a position history containing a record of position coordinates of a subject recorded in association with time, and to organize a time axis into a segment of stay and a segment of movement by extracting, as a period of stay, a time period when the speed of the subject is below a predetermined speed threshold value for a period of time equal to or more than a predetermined duration threshold value; and a place of stay identification unit configured to identify positions of places of stay corresponding to a plurality of segments of stay identified by the categorization unit, by referring to a distribution of position coordinates in the segments of stay, and the dendrogram generation unit may use the positions of places of stay identified by the place of stay identification unit as the discretely defined geographical points.

The place of stay identification unit may derive a gravitational center of the distribution of position coordinates in each segment of stay, and the dendrogram generation unit may perform clustering the places of stay characterized by the closer distance between the gravitation centers and by the closer time distance, on a priority basis.

The place of stay identification unit may derive a graphic form that approximates the distribution of position coordinates in the segment of stay, and the dendrogram generation unit may perform clustering places of stay characterized by the closer distance between the contours of the graphic forms, on a priority basis The display image generation unit may create, as necessary map data, data for a merged map produced by pasting maps of larger scales onto corresponding areas on maps of smaller scales in the order of the scale, and the display image switching unit may switch the display image by varying the viewpoint to view the merged map from.

The display image generation unit may include in the display image the dendrogram where the level of hierarchy corresponding to the image being displayed is highlighted, and the display image switching unit may switch for output the display image in accordance with a user input for selecting a level of hierarchy in the dendrogram.

Still another embodiment of the present invention relates to an information processing method. The information processing method is for outputting a display image showing a plurality of discretely defined geographical points on a map, and comprises: creating a dendrogram by acquiring from a memory position information of the geographical points and forming clusters using hierarchical clustering; determining a scale and a display area of a plurality of maps for displaying the clusters such that the plurality of maps correspond to a plurality of levels of a hierarchy of the created dendrogram; acquiring necessary map data based on the scale and the display area of the map determined, to generate data for a display image showing positions of the clusters using graphic forms on each map, and to stored the generated data in a storage; and switching the display image for output to a display device, in accordance with a user's command input for switching the level of the hierarchy.

Still another embodiment of the present invention relates to a computer program embedded in a computer readable medium. The computer program embedded in a computer readable medium is for outputting a display image showing a plurality of discretely defined geographical points on a map, and comprises: a module configured to create a dendrogram by acquiring from a memory position information of the geographical points and forming clusters using hierarchical clustering; a module configured to determine a scale and a display area of a plurality of maps for displaying the clusters such that the plurality of maps correspond to a plurality of levels of a hierarchy of the created dendrogram; a module configured to acquire necessary map data based on the scale and the display area of the map determined, to generate data for a display image showing positions of the clusters using graphic forms on each map, and to stored the generated data in a storage; and a module configured to switch the display image for output to a display device, in accordance with a user's command input for switching the level of the hierarchy.

Still another embodiment of the present invention relates to a computer readable recording medium having embedded therein a computer program. The computer readable recording medium has embedded thereon a computer program for outputting a display image showing a plurality of discretely defined geographical points on a map, the program comprising: a module configured to create a dendrogram by acquiring from a memory position information of the geographical points and forming clusters using hierarchical clustering; a module configured to determine a scale and a display area of a plurality of maps for displaying the clusters such that the plurality of maps correspond to a plurality of levels of a hierarchy of the created dendrogram; a module configured to acquire necessary map data based on the scale and the display area of the map determined, to generate data for a display image showing positions of the clusters using graphic forms on each map, and to stored the generated data in a storage; and a module configured to switch the display image for output to a display device, in accordance with a user's command input for switching the level of the hierarchy.

Yet another embodiment of the present invention relates to an information processing apparatus. The information processing apparatus is for outputting contents extracted from a plurality of contents acquired in a time range, and comprises: a time segmentation information acquisition unit configured to acquire segmentation information defined for a time axis in the time range and information on an attribute defined for each time segment; an output amount determination unit configured to determine, for each time segment, an amount of contents that should be selected for output from the contents acquired in the time segment, based on the segmentation information and the attribute information; a content selection unit configured to select, for each time segment, contents of the amount determined by the output amount determination unit from the contents acquired in the time segment, according to a predetermined rule; and an output data generation unit configured to generate output data for sequentially outputting the contents selected by the content selection unit.

The term "contents" refer to any reproducible data recorded using an electronic device or information equipment or a combination thereof. For example, the contents may be image data (e.g., photos, moving images, computer graphics, hand drawn pictures turned into electronic data), text data such as memos and lyrics, or sound data recorded using a voice recorder or recording equipment.

The information processing apparatus may further comprise: a categorization unit configured to determine time-dependent change of a parameter indicating a speed by referring to a position history containing a record of position coordinates of a subject recorded in association with time, and to organize a time axis into a segment of stay and a segment of movement by extracting, as a period of stay, a time period when the speed of the subject is below a predetermined speed threshold value for a period of time equal to or more than a predetermined duration threshold value, and the time segmentation information acquisition unit may acquire segmentation between the segment of stay and the segment of movement as the segmentation information, and acquire stay and movement as the attribute information, and the output amount determination unit may determine the amount of output contents based on a value defining the ratio in the output amount between the segment of stay and the segment of movement.

The information processing apparatus may further comprise: a place of stay identification unit configured to identify positions of places of stay corresponding to a plurality of segments of stay identified by the categorization unit, by referring to a distribution of position coordinates in the segments of stay, and the output data generation unit may sequentially output the contents selected for each segment of stay and each segment of movement, and generate data for an image showing, concurrently with the output of the contents, i) a map of the place of stay corresponding to the segment of stay for which the contents are being output or ii) a map of a movement route corresponding to the segment of movement for which the contents are being output and which is obtained by connecting the position coordinates.

The output data generation unit may generate data for moving images that re-creates a movement as recorded, by allowing a character to move in the movement route and the place of stay on the map, and generate output data such that the contents selected for the segment of movement or the segment of stay where the character is located on the time axis are output concurrently with the display of the moving images.

The output data generation unit may cluster a plurality of places of stay according to a predetermined rule so as to generate data for the places of stay having a hierarchical structure, and, generate data for moving images where the display is switched such that, when the character arrives at a place of stay higher in the hierarchy and being a cluster comprising a plurality of places of stay, the map corresponding to the plurality of places belonging to a underlying layer of the place of stay arrived at is displayed.

The content selection unit may categorize images forming the acquired contents into portraits and non-portraits by subjecting the images to a facial recognition process, and select images for each category based on a predefined ratio between the portraits and non-portraits to be displayed.

When the amount of contents acquired is less than the amount of contents determined by the output amount determination unit for the corresponding time segment, the content selection unit may address the shortage by acquiring contents from a content provider server connected via a network or from a build-in storage.

The content selection unit may compare, at a time, two of the contents acquired in the time segment, starting with a pair of contents with the closest acquisition time, and eliminates one of the contents from selection by evaluating the contents according to a predetermined criterion.

The content selection unit may select the image by evaluating the image using at least one of i) a proportion of a facial area in a portrait, ii) the number of faces, and iii) an attribute of a person acquired through a facial recognition process, as an indicator.

The content selection unit may select the contents by evaluating the contents using information attached to the contents as an indicator.

The output amount determination unit may determine the amount of contents in accordance with the amount of contents acquired in the time segment and a proportion of the time segment relative to the time range.

Still another embodiment of the present invention relates to an information processing method. The information processing method is for outputting contents extracted from a plurality of contents acquired in a time range, and comprises: acquiring segmentation information defined for a time axis in the time range and information on an attribute defined for each time segment; determining, for each time segment, an amount of contents that should be selected for output from the contents acquired in the time segment, based on the segmentation information and the attribute information; selecting, for each time segment, contents of the determined amount from the contents acquired in the time segment, according to a predetermined rule; and generating output data for sequentially outputting the selected contents to an output device.

Still another embodiment of the present invention relates to a computer program embedded in a computer readable medium. The computer program embedded in a computer readable recording medium is for outputting contents extracted from a plurality of contents acquired in a time range, and comprises: a module configured to acquire segmentation information defined for a time axis in the time range and information on an attribute defined for each time segment; a module configured to determine, for each time segment, an amount of contents that should be selected for output from the contents acquired in the time segment, based on the segmentation information and the attribute information; a module configured to select, for each time segment, contents of the determined amount from the contents acquired in the time segment, according to a predetermined rule; and a module configured to generate output data for sequentially outputting the selected contents to an output device.

Still another embodiment of the present invention relates to a computer readable recording medium having embedded therein a computer program. The computer readable recording medium has embedded thereon a computer program for outputting contents extracted from a plurality of contents acquired in a time range, the program comprising: a module configured to acquire segmentation information defined for a time axis in the time range and information on an attribute defined for each time segment; a module configured to determine, for each time segment, an amount of contents that should be selected for output from the contents acquired in the time segment, based on the segmentation information and the attribute information; a module configured to select, for each time segment, contents of the determined amount from the contents acquired in the time segment, according to a predetermined rule; and a module configured to generate output data for sequentially outputting the selected contents to an output device.

Optional combinations of the aforementioned constituting elements, and implementations of the invention in the form of methods, apparatuses, systems, computer programs, recording mediums embodying computer programs may also be practiced as additional modes of the present invention

BRIEF DESCRIPTION OF THE DRAWINGS

Embodiments will now be described, by way of example only, with reference to the accompanying drawings which are meant to be exemplary, not limiting, and wherein like elements are numbered alike in several Figures, in which.

DETAILED DESCRIPTION OF THE INVENTION

The invention will now be described by reference to the preferred embodiments. This does not intend to limit the scope of the present invention, but to exemplify the invention.

First Embodiment

In this embodiment, places of stay and routes of movement are identified based on a history of positions of a person recorded over time. Various information based on personal behavior is presented, by allowing for the concept of place with a certain expanse and temporal link. Information that can be provided includes information related to a history of movement of a user as an individual or place information obtained as a result of merging histories of movement of a plurality of users. In the following description, place information based on a person's behavior will also be represented as behavioral information. In interpreting the embodiment, "person" is interchangeable with any moving object including "animal", "vehicle", etc.

Figure 1:
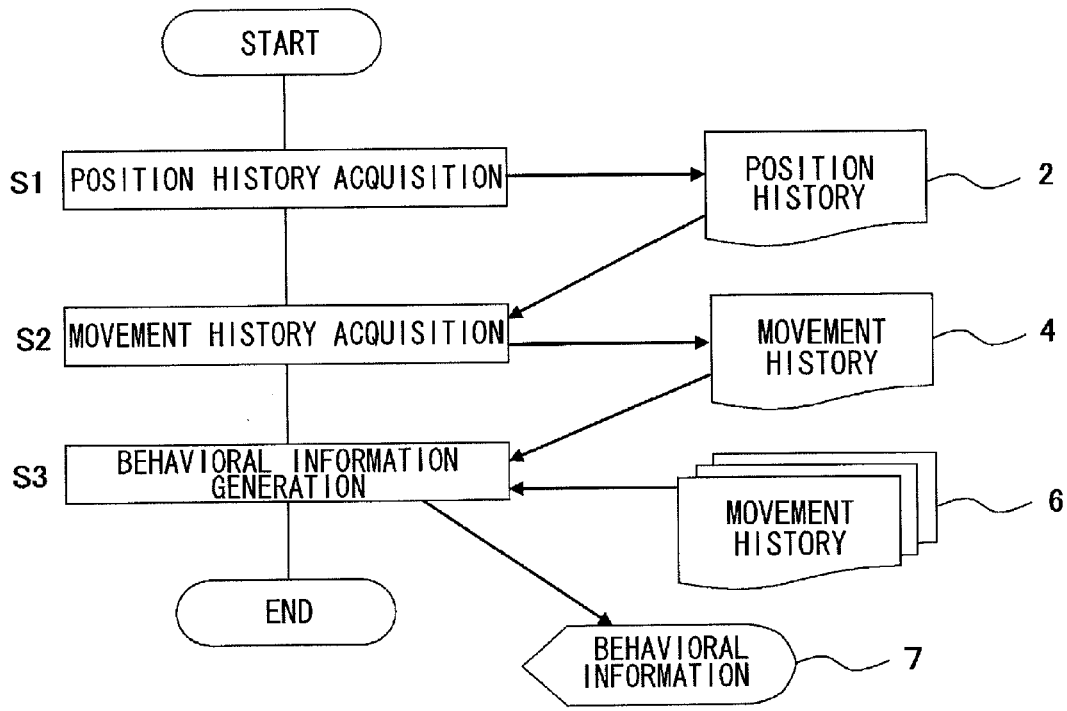
FIG. 1 schematically shows the flow of data processing according to the first embodiment.

FIG. 1 schematically shows the flow of data processing according to this embodiment. The flow of data processing according to the embodiment is largely broken down into three stages including acquisition of position history, generation of movement history, and generation of behavioral information. The process of acquiring position history (S1) records position information on a person on a real time basis and turns the record into position history. Position history represents data resulting from recording position coordinates of a person at predetermined time intervals and over a certain period of time. The unit of position history may cover any total expanse of time (e.g., a day, an outing, a trip, etc.) and is designated by the device or the user. The position history acquisition process of S1 produces a position history 2 of a single unit.

The process of generating movement history (S2) analyzes the position information 2 and analyzes a mere list of position coordinates in the position history 2 to discern a meaningful human behavior (e.g., place of stay, route of movement, frequency of visits, etc.). The process generates a movement history 4 as a result of categorization and merging. Like the position history, any of various units may be employed in the movement history. The process of generating behavioral information (S3) visualizes the movement history 4 as behavioral information 7 in a format desired by the user. Depending on the format of the behavioral information 7, a plurality of units of movement history 6 are used as input data. The processes S1 through S3 may be performed in a continuous flow. Alternatively, data output from the respective processes may be stored in a storage so that the processes are performed individually according to a user command. Still alternatively, the first two stages of the three stages, or the last two stages may be performed continuously.

The position history acquisition process of S1 can be implemented by using a satellite and using a conventional device or method such as that embodied by cell phones or vehicle navigation systems provided with the GPS receiver function. A description will now be given of the movement history generation process (S2) and behavioral information generation process (S3).

Figure 2:
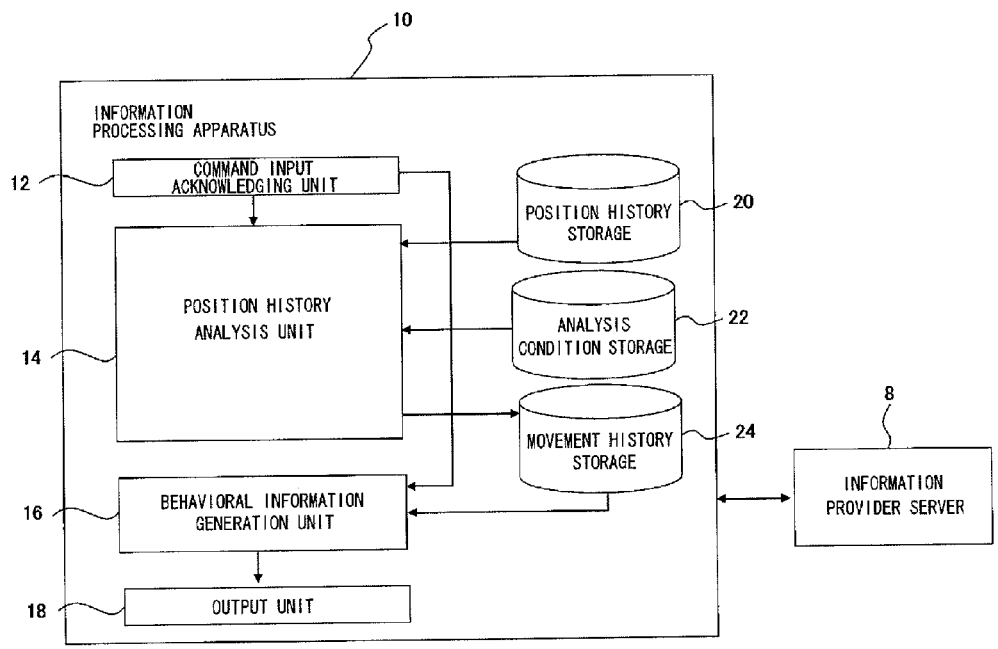
FIG. 2 shows the configuration of an information processing apparatus according to the first embodiment.

FIG. 2 shows the configuration of an information processing apparatus 10 according to this embodiment. The information processing apparatus 10 includes a command input acknowledgement unit 12 for acknowledging a command input from the user, a position history analysis unit 14 for analyzing position information and generating a movement history, a behavioral information generation unit 16 for generating behavioral information based on the movement history, and a output unit 18 for outputting the behavioral information. The information processing apparatus further includes a position history storage 20 for storing a position history analyzed by the position history analysis unit 14, an analysis condition storage 22 for storing parameters used in the analysis, and a movement history storage 24 for storing the movement history resulting from the analysis.

The elements depicted in FIG. 2. as functional blocks for performing various processes are implemented by hardware such as a central processing unit (CPU), memory, or other LSI's, and by software such as a programs etc., loaded into the memory. Therefore, it will be obvious to those skilled in the art that the functional blocks may be implemented in a variety of manners by hardware only, software only, or a combination of thereof.

The command input acknowledgement unit 12 acknowledges designation of a file containing a position history that should be analyzed, and a request related to the presentation of behavioral information from a user.
Depending on the content, the acknowledged information is supplied to the position history analysis unit 14 or the behavioral information generation unit 16 as appropriate. The command input acknowledgement unit 12 may be implemented by an ordinary input device such as a mouse, keyboard, touch panel, or button.

The position history analysis unit 14 reads the designated file containing a position history from the position history storage 20 and analyzes the history using the parameters stored in the analysis condition storage 22. More specifically, the unit 14 categorizes the data series comprising time stamps and position coordinates into segments of stay and segments of movement on a time axis. The unit 14 evaluates the original data series segment by segment so as to generate a movement history that allows for the flow of time and spatial expanse of places of stay. The result thus generated is stored in the movement history storage 24.

The behavioral information generation unit 16 reads the movement history generated by the position history analysis unit 14 from the movement history storage 24 and generates behavioral information in the format that conforms to the request entered by the user via the command input acknowledgement unit 12. Examples of the format of behavioral information include: (1) graphically representing and visualizing the place of stay and movement route in one unit or a plurality of units of movement history; (2) retrieving from a plurality of units of movement history the one that matches a condition; and (3) merging a plurality of units of movement history and presenting a tendency in terms of places and routes. A specific example will be given later.

The output unit 18 outputs the behavioral information generated by the behavioral information generation unit 16 and comprising image data and text data. The output unit 18 comprises an output device, such as a display device and a printer provided in the information processing apparatus 10, and a controller of the device. As shown in FIG. 2, the information processing apparatus 10 may be connected to an information provider server 8 via the network so as to acquire information necessary to generate behavioral information or request the information provider server 8 to perform a part for the process. A specific example will be given later. In an embodiment as described above, the information processing system comprising the information processing apparatus 10 and the information provider server 8 implement this embodiment.

Figure 3:
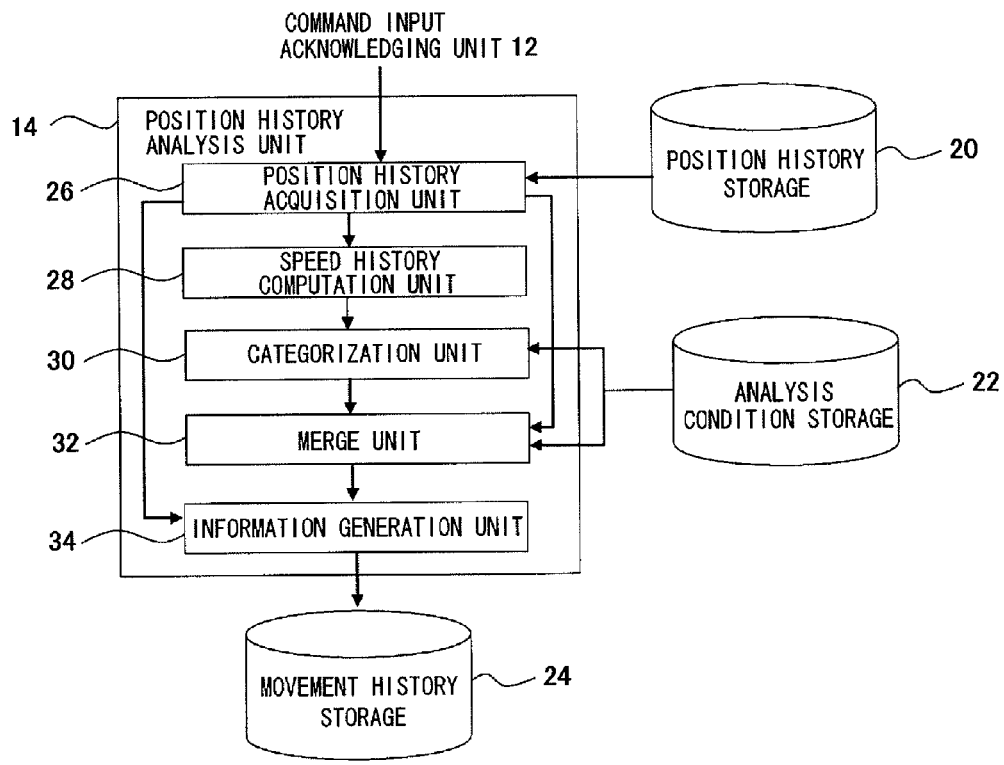
FIG. 3 shows the configuration of the position history analysis unit according to the first embodiment in further detail.

FIG. 3 shows the configuration of the position history analysis unit 14 in further detail. The position history analysis unit 14 includes a position history acquisition unit 26, a speed history computation unit 28, a categorization unit 30, a merge unit 32, and an information generation unit 34. The position history acquisition unit 26 acquires information on a position history file designated via the command input acknowledgement unit 12 and reads the position history file from the position history storage 20. It will be assumed below that the position coordinates recorded in the position history are represented by (latitude, longitude). Depending on the means of storing a position history, however, an alternate method of representation (e.g., x coordinates and y coordinates on the map) may be employed and equally used in the inventive process.

The speed history computation unit 28 refers to the position history and identifies a speed history from the speed occurring at each point of time. In the event that a portion of the data for position coordinates is missing for some reason (e.g., electromagnetic interference), data interpolation is performed based on preceding and subsequent position coordinates. The speed history thus determined is smoothed in order to remove aberrant values. The preprocessing and postprocessing described above increase prevision of subsequent analysis.

The categorization unit 30 organizes a time axis in the position history, and, ultimately, data for position coordinates occurring at respective points of time, into segments of stay and segments of movement, by checking the speed history against a threshold value. By setting a plurality of threshold values, a plurality of categorization patterns are generated (described later in detail). This obtains a result of analysis in which different abstraction levels of places as determined by differences in the scale of speed (e.g., movement by air, movement by a vehicle, movement on foot, etc.) are allowed for.

The merge unit 32 detects segments of stay which occur at different points of time but which are identified as indicating stays in the same place, by feeding the time flow, categorized into segments of stay and segments of movement by the categorization unit 30 based on the speed, back to the position coordinates in the respective segments. The unit 32 merges the segments of stay as needed. The unit 32 merges the segments of stay as needed. More specifically, the distribution of position coordinates in the respective segments of stay is approximated by a graphic form. A determination is then made as to whether the user is staying at the same place or staying at respective places only once, by referring to the way that the graphic forms overlap and continuity over time. By further evaluating the distribution of position coordinates in the segments of stay thus merged, segments of stay and segments of movement over time are ultimately determined along a time axis. The merge unit 32 may further acknowledge user designation of segments of stay that should be merged and merge the designated segments of stay and segments sandwiched thereby in accordance with the designation.

The information generation unit 34 evaluates a set of position coordinates and speed values in each segment of stay and in each segment of movement thus obtained and derives predetermined information on each segment. In the case that the user stays at the same place on different occasions, information on the respective segments of stay are merged so as to produce information on that place. Items of information derived in this process will be illustrated later. The information generation unit 34 stores the information thus obtained in the movement history storage 24 as the movement history.

Figure 4:
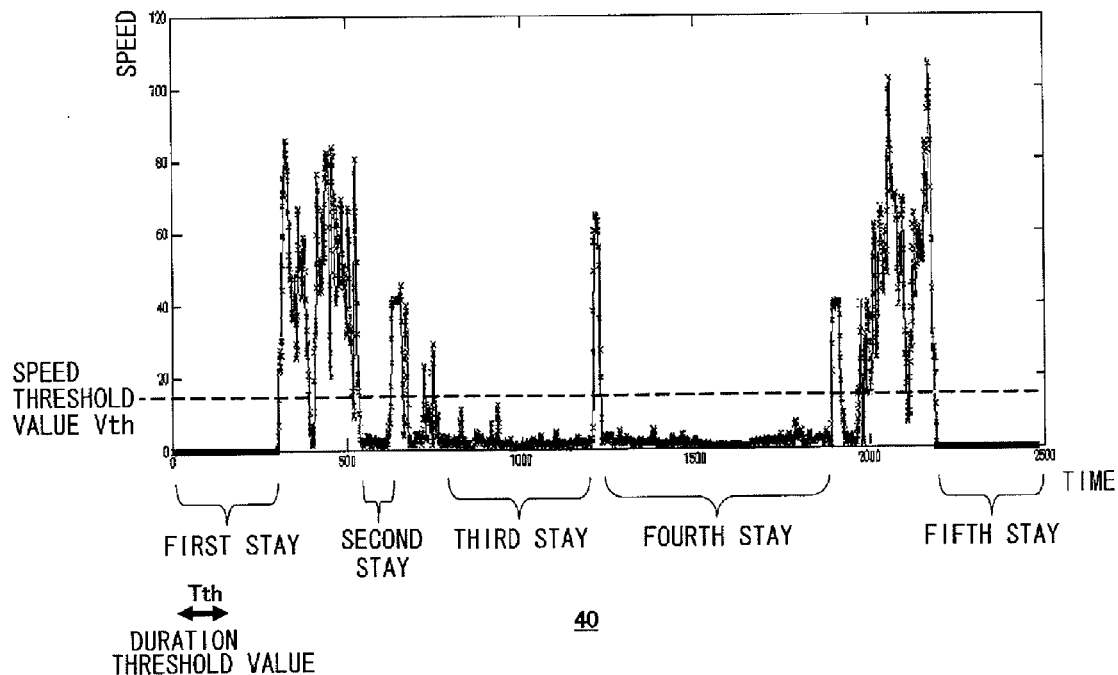
FIG. 4 shows an example of speed history computed by the speed history computation unit according to the first embodiment.

FIG. 4 shows an example of speed history computed by the speed history computation unit 28. A speed history 40 is presented as change in speed with time (horizontal axis). As mentioned above, the speed history is obtained by interpolation of position coordinates, computation of speed, and smoothing. Interpolation of coordinates is performed by applying a known technology such as linear interpolation or spline interpolation to a data defect occurring on a line connecting two-dimensional coordinates represented by (latitude, longitude) in the order of time. The speed at each point of time is basically obtained by dividing the amount of change in position coordinates from a previous point of time by a time interval. If the information is designed to be ultimately presented by, for example, using a Mercator map, parameters (latitude, longitude) are converted into (x coordinates, y coordinates) on the map.

Assuming that positional information is acquired at time . . . , t−1, t, t+1, . . . , the expression for converting latitude la(t) and longitude lo(t) at time t into two-dimensional coordinates x(t) and y(t) on a Mercator map is as follows.

$$x(t) = la(t) \times \pi / 180.0 f$$

$$y(t) = a \sin h(\tan(lo(t) \times \pi / 180.0 f))$$

Once the speed at each point of time is obtained, aberrant values are excluded by smoothing the temporal change in the speed. Smoothing is performed by applying a known method such as a median filter. A speed threshold value Vth and a duration threshold value Tth are defined for the speed history 40 thus obtained. The categorization unit 30 extracts a segment in which the speed is below the speed threshold value Vth for a period of time equal to or longer than the duration threshold value Tth, as a segment of stay. Referring to FIG. 4, five segments of stay, "first stay", "second stay", "third stay", "fourth stay", and "fifth stay" are extracted. By introducing the duration threshold value Tth, suspension of movement occurring for only a short period of time (e.g., stop at a traffic light) that is not desirably extracted as stay can be excluded from extraction.

Figure 5:
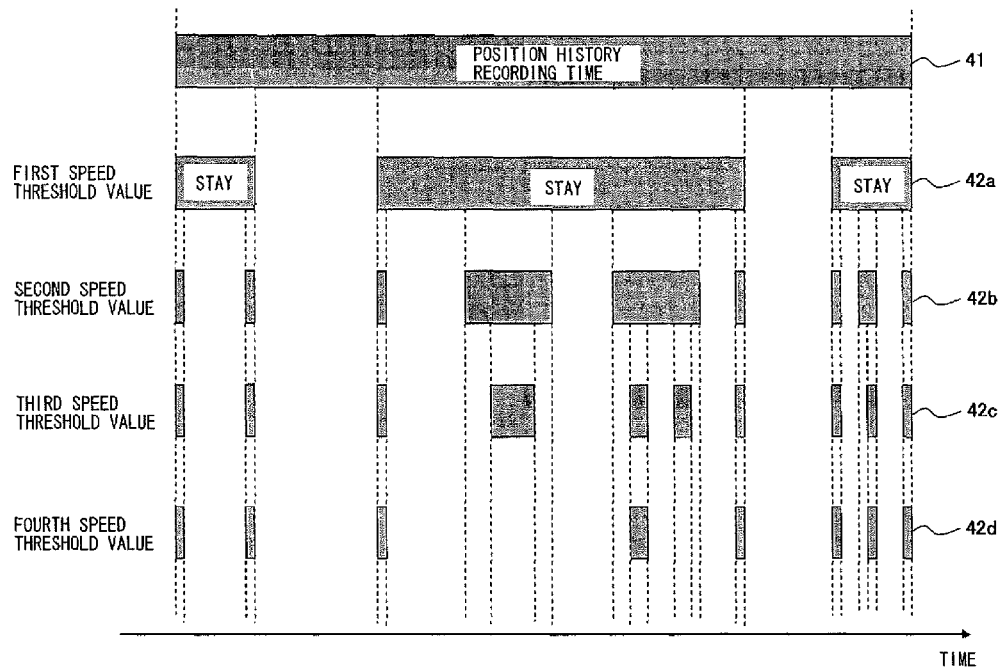
FIG. 5 shows a relation between segments of stay extracted when four speed threshold values are set according to the first embodiment.

A plurality of speed threshold values are set and stored in the analysis condition storage 22 along with the duration threshold value Tth. The categorization unit 30 makes a determination using threshold values, using the larger speed threshold value first. FIG. 5 shows a relation between segments of stay extracted when four speed threshold values are set. The horizontal direction indicates passage of time. Referring to the figure, the first speed threshold value, the second speed threshold value, the third speed threshold value, and the fourth speed threshold value are set in the descending order of values.

The first speed threshold value is applied to the speed in an entire period 41 in which the position history of a user under analysis is recorded, so as to make the above-mentioned determination using the threshold. As a result, segments of stay 42a are extracted. Subsequently, determination using the second speed threshold value that is one step smaller is made only on the speed occurring in the segments of stay 42a thus extracted. As a result, segments 42b are extracted. Further, determination using the third speed threshold value is made only on the speed occurring in the segments of stay 42b. As a result, segments 42c are extracted. Similarly, determination using the fourth speed threshold value is made in the segments of stay 42c. As a result, segments 42d are extracted.

Through these processes, four patterns of segments of stay are generated. It should be noted that a pattern of segments higher in the hierarchy and characterized by a larger speed threshold value encompasses a lower pattern of segments characterized by a smaller speed threshold value. The number of speed threshold values is not limited to four. A plurality of speed threshold values are introduced in this embodiment in order to switch the abstraction levels of places of stay depending on the information presented. For example, it will be assumed that the position history of a trip across a plurality of countries using an airplane is processed. By using a pattern of segments of stay defined by a speed threshold value close to the speed of an airplane, places of stay can be shown in units of countries or cities visited. Meanwhile, using a pattern of segments of stay defined by a speed close to the walking speed will show places of stay in units of, for example, buildings visited while taking a walk in places of visit in each country.

By using a plurality of speed threshold values to set multiple stages of threshold values ranging from the speed of an airplane to the walking speed, abstraction levels of places are varied in multiple stages depending on differences in the distance felt in different means of travel such as trains, vehicles, etc. In any case, segments of stay are extracted along the passage of time as shown in FIG. 5. Thus, suspension of movement (stay) can be incorporated into the time flow and represented as part of a movement history, along with frequency of visits and the movement route used to reach the segment of stay.

Figure 6:
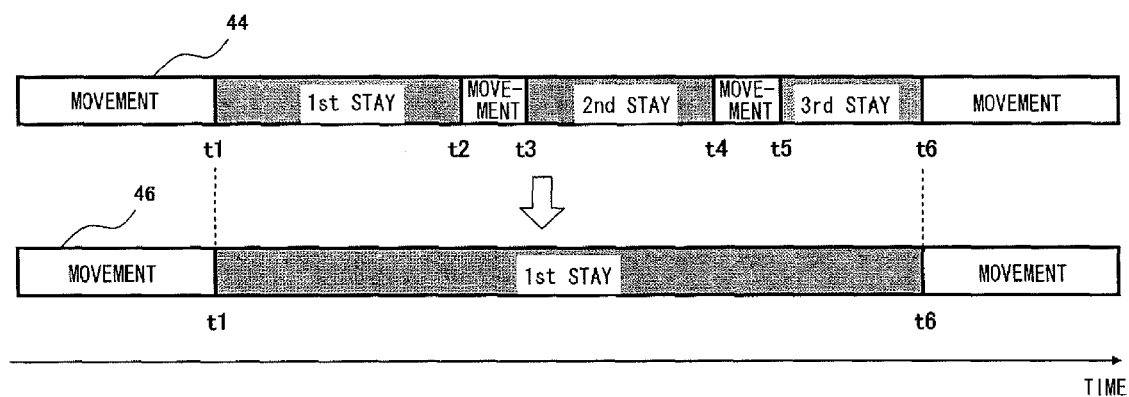
FIG. 6 shows how the merge unit merges segments of stay according to the first embodiment.

The segments of stay extracted as described above are merged based on the original position history. FIG. 6 shows how the merge unit 32 merges segments of stay. As in FIG. 5, the horizontal direction indicates passage of time. The upper half of the figure shows a pattern of segments of stay 44 before the merge and the lower half shows a pattern of segments of stay 46 after the merge. For convenience sake, segments before and after the segment of stay are indicated as segments of movement in the figure. However, the segments of movement are ultimately determined once the ultimate pattern of segments of stay is determined after the merge. It will be assumed that "the first stay" between time t1 and t2, "the second stay" between time t3 and t4, and "the third stay" between time t5 and t6 are extracted as segments of stay in the pattern of segments of stay 44 before the merge.

Extraction of segments of stay by the categorization unit 30 is based only on the speed. Meanwhile, if the user is staying in, for example, a park, amusement park, golf link, or athletic field, which are extensive premises but which could be regarded as a single place, it may be desirable to regard the user as staying in a single place even if the user is running in the premises or moving therein riding a cart. For this reason, segments of stay are evaluated in the perspective of space by feeding back the result of extracting segments of stay according to the speed to the position coordinate information. Thereby, segments of stay are merged as needed, or stays dispersed across time may be recorded as stays at the same place.

More specifically, a determination is made as to whether the user is staying at the same place by referring to how the distributions of position coordinates in the segments of stay overlap. Further, when there are no segments of stay in another place between those segments of stay, it is determined that the user is staying at the place once so that the segments of stay are merged. In the example of FIG. 6, "the first stay", "the second stay", and "the third stay" are merged into a single segment of stay "the first stay" between time t1 and t6. An actual process of merging may be such that "the first stay"

and "the second stay" are first merged and the resultant segment of stay is merged with "the third stay". By using a set of position coordinates in "the first stay" ultimately obtained by the merge, a spatial expanse of the place may be identified.

Figure 7:
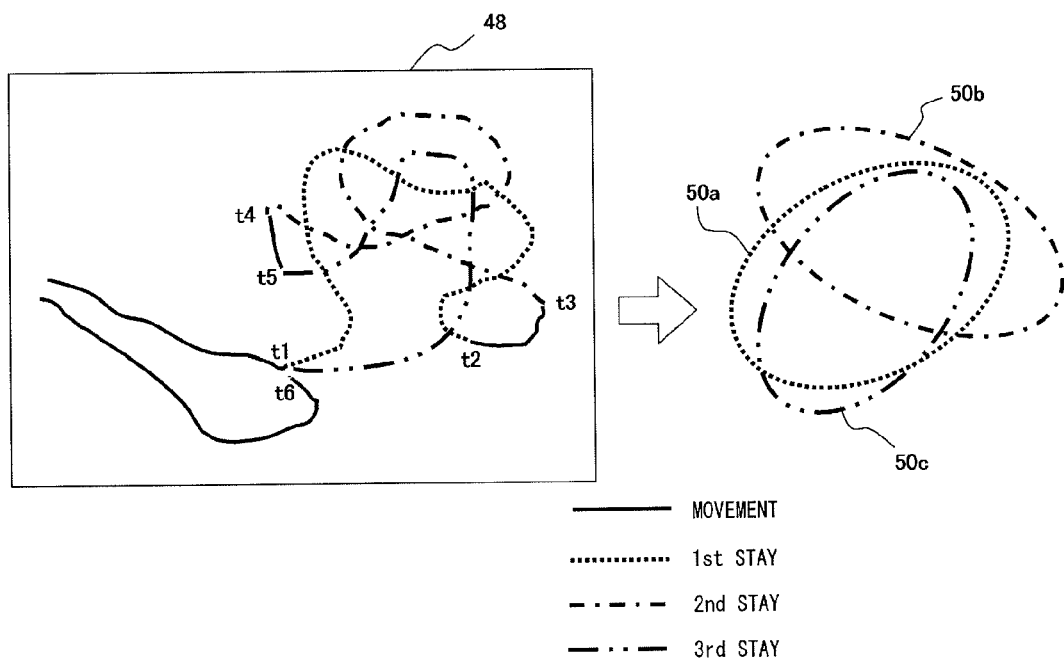
FIG. 7 shows how segments of stay are merged according to the first embodiment.

FIG. 7 shows how segments of stay are merged. As mentioned above, the pattern of segments of stay based on the speed history and the position history information originating the pattern are used in the merging process. The diagram on the left of FIG. 7 shows a movement history line 48 connecting position coordinates occurring at respective points of time in the order of time. Parameters t1 through t6 correspond to the points of time shown in FIG. 6. In other words, the dotted line between t1 and t2 denotes a segment extracted as the segment of stay "the first stay", the chain line between t3 and t4 denotes a segment extracted as the segment of stay "the second stay", and the chain double-dashed line between t5 and t6 denotes a segment extracted as the segment of stay "the third stay". Solid lines denote the other segments as indicated above, which are considered to be segments of movement before the merge.

In this plane of movement history line 48, the distribution of position coordinates included in the respective segments of stay is approximated by a predetermined graphic form. For example, a graphic form encompassing all position coordinates is derived. When the degree of overlapping between graphic forms exceeds a predefined overlapping degree threshold value, it is determined that the segments of stay corresponding to the graphic forms represent stays at the same place. The overlapping degree threshold value is stored in the analysis condition storage 22 and is read by the merge unit 32. In this case, it is desirable to smooth the data for a position history because aberrant values in position coordinates affect the resultant graphic form significantly. As in the step of determining a speed history, coordinate transformation is performed as needed.

A graphic form used in approximation (e.g., rectangle or ellipse) is predefined. An ellipse often approximates the distribution of position coordinates better than a rectangle due to lack of corners. On the other hand, calculation is easy if a rectangle is used. Therefore, the graphic form to use is suitably selected considering required precision, computational load, etc. In the example of FIG. 7, ellipses 50a, 50b, and 50c are derived for the segments of stay "the first stay", "the second stay", and "the third stay". When an ellipse is used, position coordinates included in a segment of stay are averaged so as to determine the coordinates of a gravitational center. The angle of rotation of the ellipse is determined as given below. First, the second-order covariance matrix is given by the following expression when the coordinates of the gravitational center are denoted by (mx, my).

$$\begin{pmatrix} \Sigma x^2 & \Sigma xy \\ \Sigma xy & \Sigma y^2 \end{pmatrix} = \begin{pmatrix} \Sigma(x(p)-m_x)^2 & \Sigma((x(p)-m_x)(y(p)-m_y)) \\ \Sigma((x(p)-m_x)(y(p)-m_y)) & \Sigma(x(p)-m_y)^2 \end{pmatrix}$$

where (x(p), y(p)) denote position coordinates.

The eigen value λ of the matrix is given by the following expression.

$$(\lambda - \Sigma x^2)(\lambda - \Sigma y^2) - (\Sigma xy)^2 = 0$$

Using the eigen value λ, the angle of the ellipse θ is determined by the following expression.

$$\begin{pmatrix} \cos\theta & -\sin\theta \\ \sin\theta & \cos\theta \end{pmatrix} \begin{pmatrix} \Sigma x^2 & \Sigma xy \\ \Sigma xy & \Sigma y^2 \end{pmatrix} \begin{pmatrix} \cos\theta & \sin\theta \\ -\sin\theta & \cos\theta \end{pmatrix} = \lambda \begin{pmatrix} 1 & 0 \\ 0 & 1 \end{pmatrix}$$

Figure 8:
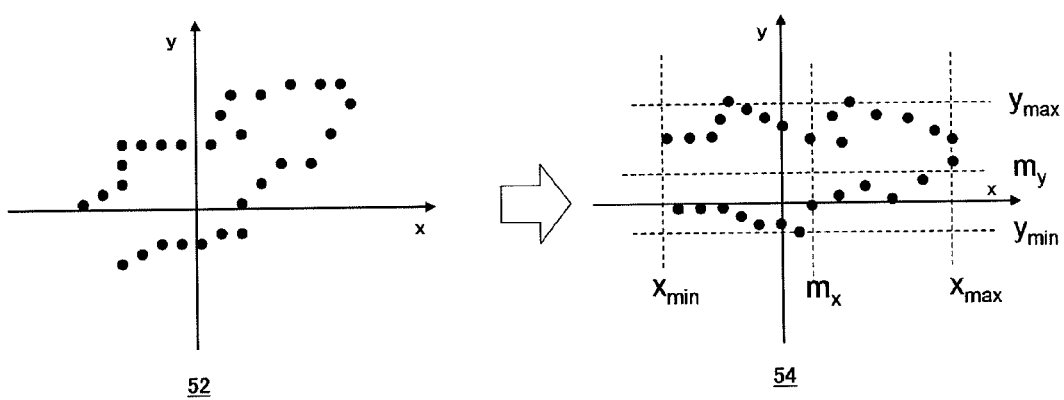
FIG. 8 shows how the distribution of position coordinates in a segment of stay is rotated so that the angle of the ellipse approximating the distribution is 0 according to the first embodiment.

The position coordinates included in the segment of stay are rotated by the angle θ of the ellipse in a direction opposite to the direction of the angle. FIG. 8 shows how the distribution of original position coordinates is rotated so that the angle of the ellipse is 0. A distribution 52 indicates a set of points of original position coordinates, and a distribution 54 indicates a set of points of position coordinates as rotated. The x coordinates of points at the maximum distances from the gravitational center ($m_x$, $m_y$) in both directions along the x-axis will be denoted by $x_{min}$, $x_{max}$. The y coordinates of points at the maximum distances in both directions along the y-axis will be denoted by $y_{min}$, $y_{max}$. The expression for the ellipse is defined as follows using $x_{min}$, $x_{max}$, $y_{min}$, and $y_{max}$.

$$\frac{(x-m_x)^2}{a^2} + \frac{(y-m_y)^2}{b^2} = 1$$

where $a=(x_{max}-x_{min})/2$, $b=(y_{max}-y_{min})/2$. The degree of overlapping of areas defined by graphic forms determined above and corresponding to respective segments of stay is then determined. For example, a determination is made as to whether a pixel is located within or outside the graphic form by performing raster scanning on a plotted image of the ellipse. The number of pixels located inside the graphic form and common to a plurality of graphic forms represents an area of the overlapping portion. Alternatively, the overlapping area may be logically computed from the mathematical expressions denoting the graphic forms such as ellipses and rectangles. Given that a portion of the area of a graphic form corresponding to a given segment of stay overlaps another graphic form, the segments of stay corresponding to the two graphic forms are determined as indicating the stay at the same place, if the ratio exceeds a predefined overlapping threshold value.

If these segments of stay do not sandwich a stay at another place, that is, the stays are continuous stays sandwiching only a segment of movement, the segments of stay are merged and turned into a single stay as shown in FIG. 6. Meanwhile, if the stays sandwich a stay at another place, the stays are regarded as stays at the same place on different occasions. If the segments of stay are merged, the distribution of position coordinates in the segment of stay as merged is approximated by a graphic form as described above so that the degree of overlapping with a graphic form corresponding to a different segment of stay is determined. By repeating these processes for all segments of stay, the pattern of segments of stay are accurately identified. In addition, the act of "stay" is linked to "place".

Figure 9:
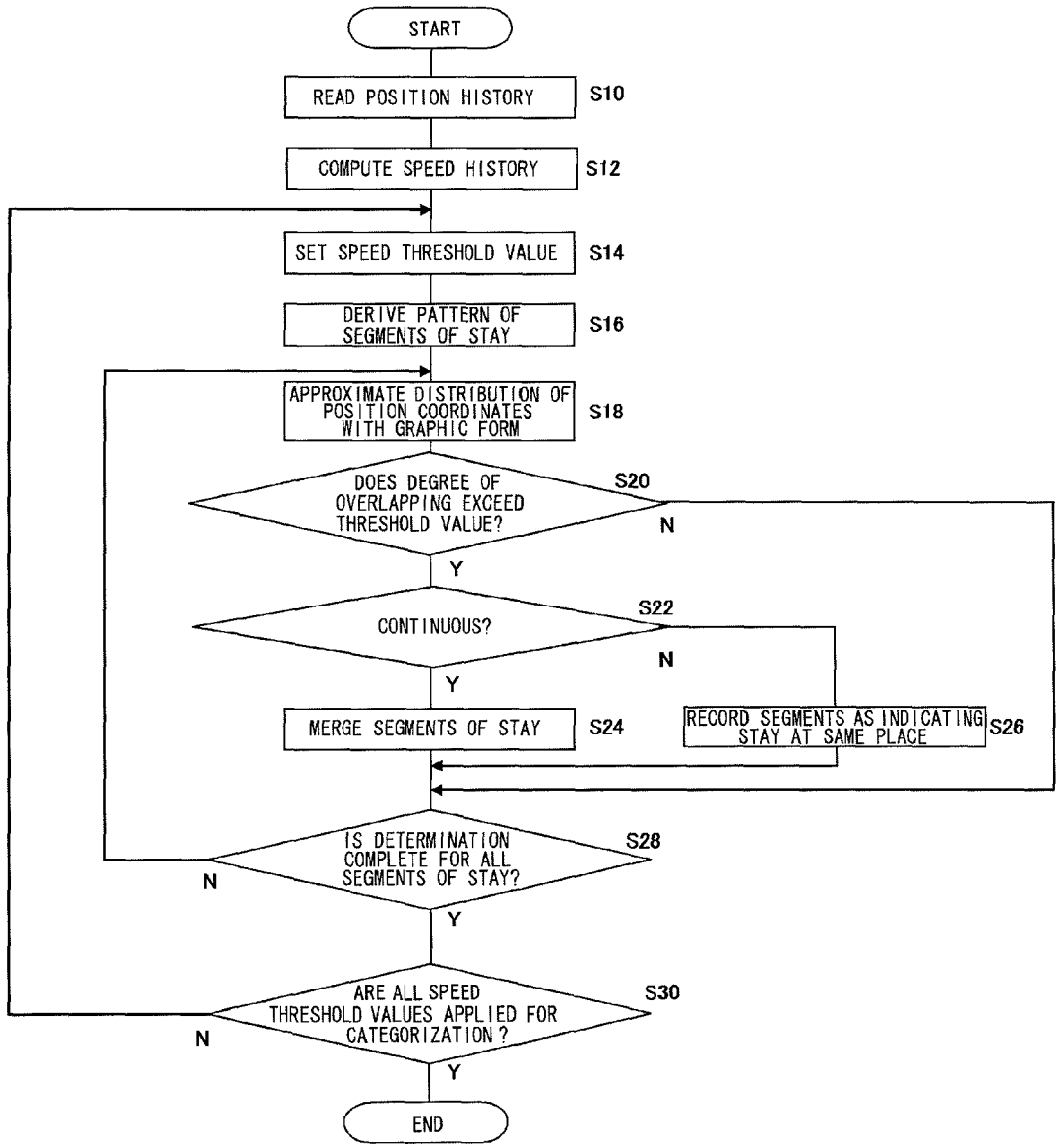
FIG. 9 is a flowchart showing how the position history analysis unit analyzes a position history according to the first embodiment.

A description will now be given of the operation for movement history generation using the configuration as described above. FIG. 9 is a flowchart showing how the position history analysis unit 14 analyzes a position history. When the command input acknowledgement unit 12 acknowledges a command for analysis from the user, the position history acquisition unit 26 reads a designated file containing a position history from the position history storage 20 (S10). The speed history computation unit 28 applies interpolation to correct data defects as needed. The unit 28 then computes the speed at respective points of time and obtains a speed history by performing a smoothing process (S12).

The categorization unit 30 then reads a plurality of speed threshold values and duration threshold values from the analysis condition storage 22. The unit 30 derives a pattern of segments of stay by setting the largest speed threshold value for determination using the threshold value and extracting segments of stay. The merge unit 32 acquires, from the position history, position coordinates included in each segment of stay in the pattern of segments of stay and approximates the distribution by a graphic form (S18). The unit 32 reads the overlapping degree threshold value from the analysis condition storage 22. If any graphic forms for which the degree of overlapping exceeds the threshold value are identified (Y in S20), a determination is made as to whether the segments of stay corresponding to the graphic forms are not intervened by another segment of stay and are continuous (S22).

If the segments are continuous (Y in S22), the segments of stay are merged and turned into a single segment of stay (S24). If the segments are not continuous (N in S22), the segments of stay remain unmerged and are recorded as stays at the same place (S26). The steps S18 through S26 are repeated for all segments of stay (N in S28, S18, S20, S22, S24, S26). If the segments of stay are merged in S24, a new determination is made as to whether the segment of stay as merged should be subject to merge. When a determination is complete for all segments of stay (Y in S28), segments of stay are extracted using the speed threshold value that is one step smaller and a determination on merge is made (N in S30, S14, S16, S18, S20, S22, S24, S26, and S28). When the above steps are repeated for all speed threshold values, the process is terminated (Y in S30).

The information generation unit 34 uses the pattern of a plurality of segments of stay corresponding to the respective speed threshold values, the original position history, the speed history which are acquired during the above-described process, and performs a computation corresponding to predefined information items so as to generate an ultimate movement history. Examples of information items generated will be shown below.

TABLE 1

| Main item | Primary sub item | Secondary sub item |
| --- | --- | --- |
| Total time | — | — |
| Number of places of stay | — | — |
| Stay data for place A | Frequency of visits | — |
|  | Stay data for 1st visit | Threshold value used |
|  |  | Corresponding place in upper level |
|  |  | Start time |
|  |  | End time |
|  |  | Number of positions included |
|  |  | Average speed |
|  |  | Average altitude |
|  |  | Average latitude, latitude |
|  |  | Range |
|  | Stay data for 2nd visit | ... |
|  | ... | ... |
| Stay data for place B | ... | ... |
| ... | ... | ... |

Main items include the total time (including stays and movement) subject to analysis, the number of places of stay, and the stay data for each place ("place A", "place B", etc.). Sub items in the stay data for each place include the frequency of visits, and the stay data for each occasion of visit (1st visit, 2nd visit, etc.). Sub items in the stay data for each occasion of visit include the speed threshold value used in the analysis, the place higher in the hierarchy and extracted using the speed threshold value higher in the hierarchy, the start time and end time of the stay, the number of position coordinates included in the place among the position coordinates recorded in the position history, the average speed, the average altitude, the average latitude, the average longitude, and the range of place.

In case the distribution of positions included in a segment of stay is approximated by a rectangle, the range of place can be represented by the top left coordinates and the length of the side of the rectangle. In case the distribution is approximated by an ellipse, the range can be represented by the gravitational center ($m_x$, $m_y$), the length of the major axis and the minor axis ($2a$ and $2b$), and the angle of inclination $\theta$. The average altitude can be computed when the altitude at each point of time is recorded in the original position history. The values of the items can be computed using a simple mathematical expression so that the description thereof is omitted.

In addition to the personal movement history information obtained from the information on a person's position history, common information may be added. For example, connection via a network may be made to the information provider server 8, which could be a server that provides photos of scenery around a location of arbitrary latitude and longitude, or to a database providing other information. The number of items of information available in association with the place of stay or position is acquired. The score of interest as defined below is computed for each place.

Score of interest=number of items of information/area of place

In other words, the score of interest denotes the density of common information available for the place and is an indicator indicating the level of people's interest in the target place. By linking information concerning a place and obtained from a variety of perspectives from personal events to general characteristics to each other, efficiency of information search is improved and convenience of mash-up display of various information is enhanced. In particular, by organizing a list of position coordinates, which is given as a position history, from the perspectives of place, act (stay/movement), and time sequence thereof, information presentation and mode of information search that are hitherto unavailable become available.

The table is illustrative only. Information (e.g., geographical name, name of premises) that could be acquired based on position coordinates by searching a database in the information processing apparatus 10 itself or in the information provider server 8 may be included in the movement history as appropriate. In the following description, not only the data obtained by analyzing a position history will be generically referred to as a movement history but individual data (e.g., individual data tem) may also be referred to as a movement history.

Figure 10:
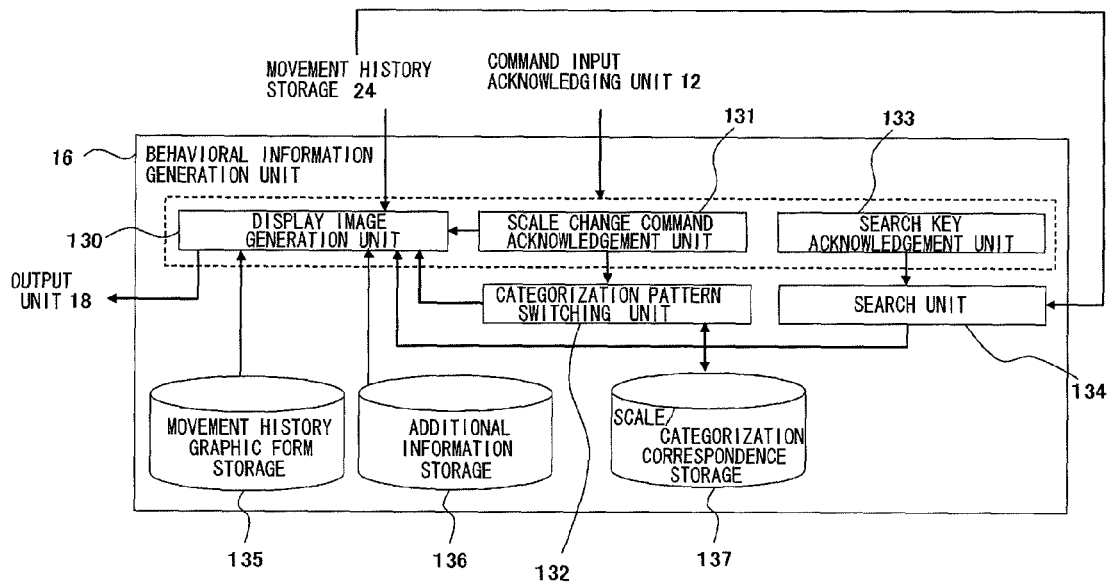
FIG. 10 shows the configuration of the behavioral information generation unit according to the first embodiment in detail.

A description will now be given of behavioral information generated by the behavioral information generation unit 16 based on the movement history obtained as described above. FIG. 10 shows the configuration of the behavioral information generation unit 16 in detail. The behavioral information generation unit 16 includes a display image generation unit 130 for generating an image showing a movement history or prompting a search for a movement history, a scale change command acknowledgement unit 131 for acknowledging a command to change the scale of a map on which the movement history is shown, a categorization pattern switching unit 132 for changing a stay/movement pattern of the movement history as displayed according to the scale of the map, a search key acknowledgement unit 133 for acknowledging a user input of a search key, and a search unit 134 for searching for a movement history according to the search key.

The behavioral information generation unit 16 further includes a movement history graphic form storage 135 for storing a graphic form necessary to show a movement history; an additional information storage 136 for storing data (e.g., photo data, graphic data for a calendar, etc.) linked to a selected item of the movement history, and a scale/categorization correspondence storage 137 for storing scale/categorization correspondence information mapping a range of map scales to categorization patterns used, the range of map scales being defied to switch the categorization pattern accordingly.

The display image generation unit 130 generates data for an image shown as behavioral information. For example, the unit 130 may generate data for a movement history display image, for a search key input image, for a search result display image, etc. The movement history display image comprises graphical representations of places of stay and movement routes on a map. The search key input image is used to search for a movement history using a search key. The generated image data is output as a display image via the output unit 18. Data necessary for generation of an image is read from the movement history graphic form storage 135 or the additional information storage 136. In addition to graphic forms showing places of stay, graphic forms showing movement histories, the movement history graphic form storage 135 also stores map data. The user enters, via the command input acknowledgement unit 12, a command to select the type of an image or, as the case requires, for selecting a movement history. The display image generation unit 130 generates data for an associated display image.

The scale change command acknowledgement unit 131 acknowledges a command to change the scale of a map being displayed entered by the user via the command input acknowledgement unit 12. By supplying the acknowledged information to the display image generation unit 130, image data where the scale of the displayed map is changed is generated. The same information is further supplied to the categorization pattern switching unit 132. The categorization pattern switching unit 132 refers to the scale/categorization correspondence information in the scale/categorization correspondence storage 137 and determines whether the designated scale exceeds a threshold that demands switching of the categorization pattern. Specific examples will be given below. In this embodiment, a plurality of patterns for categorizing segments of stay/movement are generated using a plurality of speed threshold values. By mapping the range of scale of display into the categorization pattern, the map scale is linked to the categorization pattern displayed as a movement history.

When the categorization pattern switching unit 132 determines that the categorization pattern should be switched, the unit 132 notifies the display image generation unit 130 accordingly. In this process, the unit 132 delivers, for example, identification information identifying the post-switching categorization pattern. The display image generation unit 130 switches the display of movement history by reading the post-switching movement history from the movement history storage 24 afresh and showing the history by a graphic form.

The search key acknowledgement unit 133 acknowledges a search key entered by the user via the command input acknowledgement unit 12 while a search input image is being displayed. A search key may be a character string or a cursor indicating a range on a map. Specific examples will be given below. When the search key is entered, the search key acknowledgement unit 133 supplies the search key to the search unit 134. The search unit 134 searches the movement history storage 24 using the search key and reads data for a relevant movement history. By supplying the data to the display image generation unit 130, the display image generation unit 130 generates data for an image showing the movement history as a search result.

Figure 11:
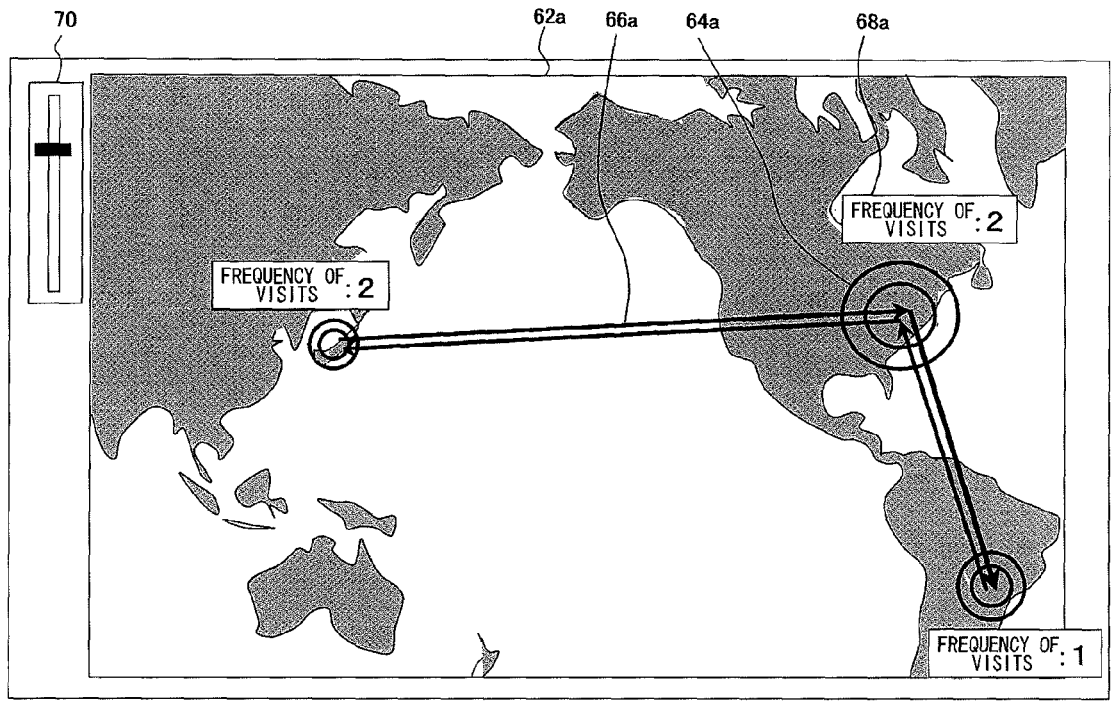
FIG. 11 shows an example of a movement history for a single trip of a user, rendering places of stay and movement routes in an image and presenting the image as behavioral information according to the first embodiment.
Figure 12:
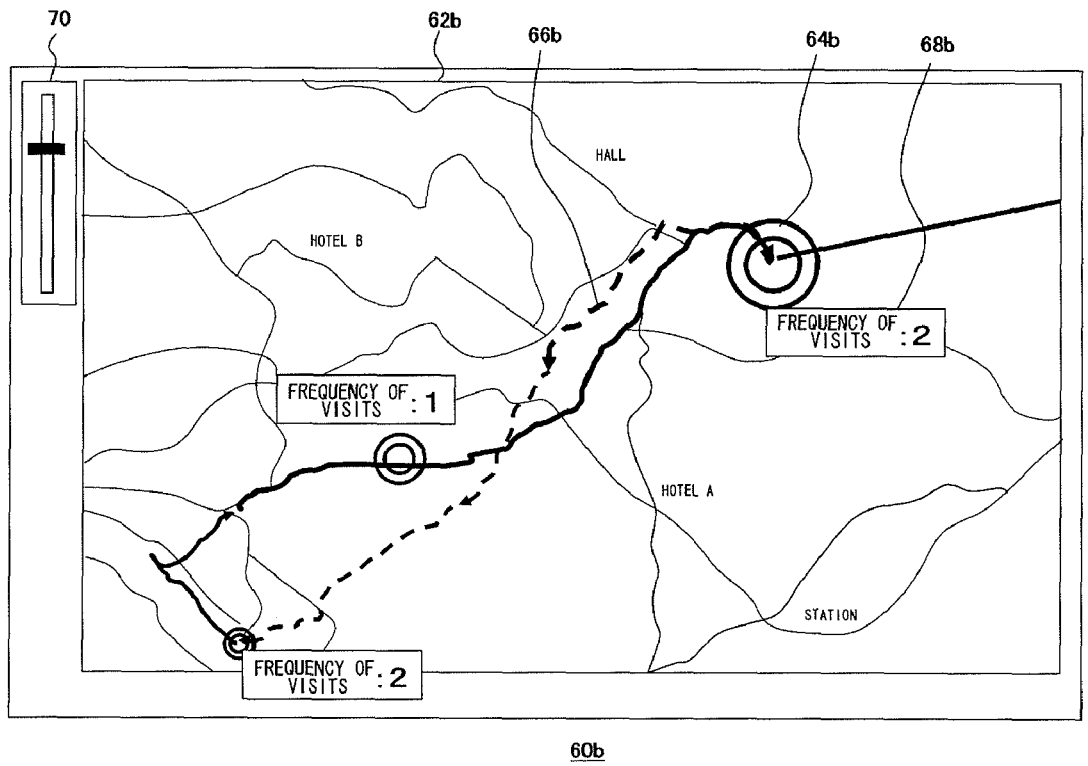
FIG. 12 shows an example of a movement history for a single trip of a user, rendering places of stay and movement routes in an image and presenting the image as behavioral information according to the first embodiment.

The behavioral information generation unit 16 may not be provided with all of the functions for displaying a movement history, switching the categorization pattern according to the scale, and performing a search. Alternatively, the unit 16 may be equipped with these functions in combination with function modules of another application such as a diary application or a schedule management application. A description will now be given of specific examples of images generated by the display image generation unit 130. FIGS. 11 and 12 show examples of a movement history for a single trip of a user, rendering places of stay and movement routes in an image and presenting the images as behavioral information. By displaying places of stay and movement routes in distinction from each other, visibility of a movement history is improved. A movement history display image 60a of FIG. 11 and a movement history display image 60b of FIG. 12 both represent a movement history of the same trip. However, the images are different in terms of the speed threshold value used in extracting segments of stay as mentioned above.

By using the speed threshold value 200 km/h in FIG. 11, a distinction is made between segments of movement where the user is traveling by air and segments of stay, i.e., the remaining segments. In contrast, by using the speed threshold value 20 km/h in FIG. 12, a distinction is made between segments of movement where the user is traveling in a vehicle and segments of stay where the user is walking or stationary. The distance as felt by the user differs when different frames are established so that the scale of distance displayed is changed accordingly. In other words, the former speed threshold value requires a scale showing countries of the world, as indicated by the movement history display image 60a of FIG. 11. The latter speed threshold value requires a scale showing individual premises and roads, as indicated by the movement history display image 60b of FIG. 12.

Thus, in displaying a movement history as an image, the speed threshold value used in extracting segments of stay is linked to the scale of distance on the image so that user events are dynamically abstracted. FIGS. 11 and 12 show a movement history on a map of a corresponding scale. However, the embodiment may be practiced otherwise. For example, only the relative positions of a plurality of places of stay and the order of visits indicated by arrows may be displayed, for example, if detailed information on routes is not necessary. In any case, the speed threshold value and the abstraction level of a place can be linked.

The movement history display image 60a of FIG. 11 includes a movement history diagram 62a and a scale change lever 70. The movement history diagram 62a shows places of stay on a world map using double circles 64a and shows movement routes between the places using lines 66a. A circle 64a showing a place of stay is drawn around the gravitational center of the distribution of position coordinates in a segment of stay. The total period of time of stay in that place of stay is represented as a radius. In this way, an element of time is shown on the two-dimensional space in addition to the position information.

The line 66a representing a movement route is obtained by connecting position coordinates recorded in a segment of movement in the order of time. Where detailed routes are not so important as in the movement history diagram 62a of FIG. 11, the display may be switched so that the movement route is shown by connecting places of stay by straight lines. In any case, the order of visits to places of stay is clarified by representing the direction of movement by an arrow. The frequency of visits to places of stay is indicated by a character string 68a. By displaying the image in such a manner, the viewer can immediately understand the routes taken and the frequency of visits to a plurality of places.

The scale change lever 70 is graphical symbol that lets the user to adjust the scale of a map in the movement history diagram 62a via the command input acknowledgement unit 12. As the user moves the scale change lever 70 up and down using a pointing device or the like, the scale of the map in the movement history diagram 62a changes continuously. When the scale of the map grows and exceeds a certain threshold value, the movement history display image 60b of FIG. 12 is displayed.

In other words, the display is switched to a pattern of segments of stay defined according to a different speed threshold value, based on the threshold value defined for the scale. To achieve this, ranges of scales and speed threshold values are mapped into one another. This allows seamless switching between movement histories associated with a change in scale. Of course, speed threshold values may be set such that the movement histories are displayed in multiple stages between FIGS. 11 and 12.

The movement history display image 60b of FIG. 12 also includes the movement history diagram 62b and the scale change lever 70. Circles 64b showing places of stay, lines 66b showing movement routes, and characters 68b showing the frequency of visits to places of stay are displayed in the movement history diagram 62b. As illustrated, the scale of the movement history diagram 62b of FIG. 12 shows roads. Therefore, the road used for the movement is clearly identified by representing movement routes by lines connecting position coordinates in the record.

Figure 13:
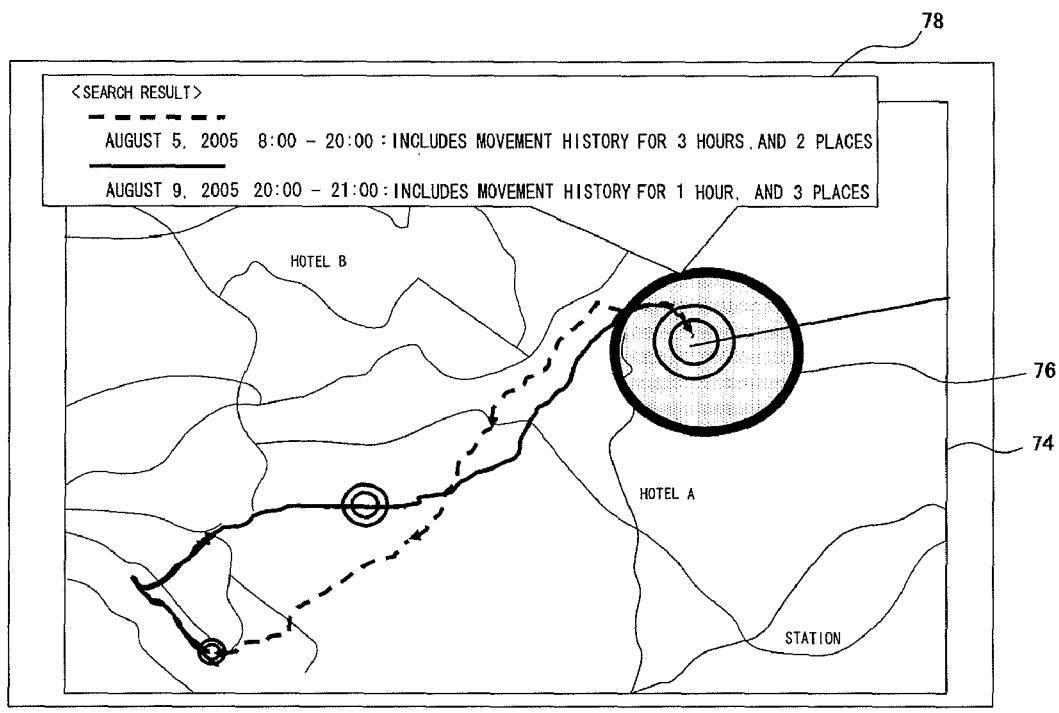
FIG. 13 shows another example of behavioral information generated by the behavioral information generation unit according to the first embodiment.

FIG. 13 shows another example of behavioral information generated by the behavioral information generation unit 16. In this example, a search screen is displayed for searching a plurality of units of movement histories stored in the movement history storage 24 for a movement history that matches a condition. The target of search may be all movement histories stored in the movement history storage 24 or those movement histories originated from position histories recorded during a period of time designated by the user. The example of FIG. 13 is an image showing a search result yielded when a position on a map is used as a search key. Prior to the search, the behavioral information generation unit 16 displays a map 74 on a movement history search image 72. The display range and scale of the map 74 can be modified by the user via the command input acknowledgement unit 12.

Further, a cursor 76 that can be moved by the user via the command input acknowledgement unit 12 is displayed on the map 74. The cursor 76 is circular in shape so that a predetermined range can be designated on the map. The user uses the cursor 76 to designate a position input as a search key. More specifically, as the user moves the cursor 76 to a desired place and confirms the selection by, for example, pressing the enter button of the command acknowledgement unit 12, the behavioral information generation unit 16 reads a movement history that includes a place of stay located within the range designated by the cursor 76 from the movement history storage 24.

As in FIGS. 11 and 12, the unit 16 refers to the movement history thus read and displays on the map 74 graphical representations of places of stay and routes included in the movement history. If a plurality of movement histories match the search criteria, a distinction is made between the histories by varying the color or shape of the graphic forms. Further, selected items of the movement history are displayed using character information 78. Referring to FIG. 13, legends such as the date and time when the position history originating the movement history is recorded, the total time, and the number of places of stay are displayed for graphic forms representing routes in the movement history.

By making movement histories searchable in such a manner, even a user having recorded voluminous position histories in the past can easily identify a movement history indicating a stay in a given place. For example, by searching for a history generated when the user traveled in the same area in the past, the user can build a travel plan on the past experience by acquiring movement routes taken and information on shops etc. that the user dropped by in the past. The movement history may not be displayed on a map but may be displayed on an illustration of a shop, etc., or on an aerial photo. Alternatively, a movement history may be displayed in isolation. Still alternatively, only the distribution of places of stay represented in color shades or graphical forms may be displayed.

Figure 14:
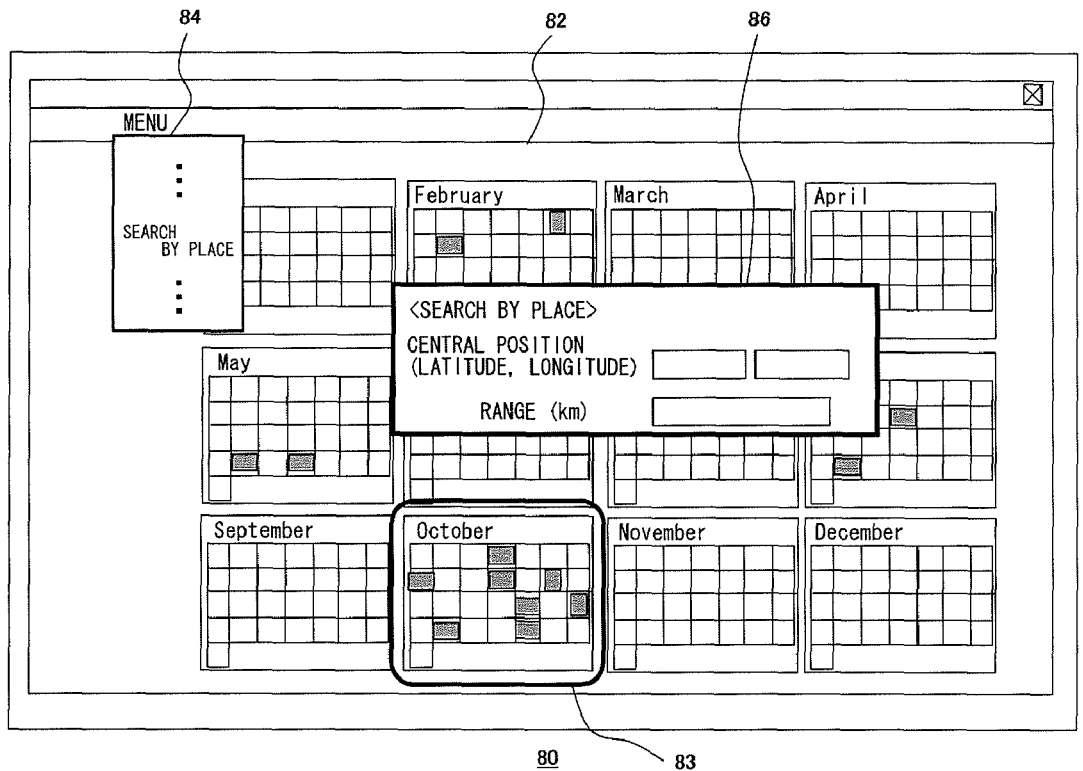
FIG. 14 shows another example of behavioral information generated by the behavioral information generation unit according to the first embodiment.

FIG. 13 shows an example where a position on a map is used as a search key. Since a place of stay as part of a movement history is extracted in this embodiment, a place can be used as meta data for a movement history, and, ultimately, for a personal event. FIG. 14 shows another exemplary image in which the mode described above is implemented. In this example, movement histories stored in the movement history storage 24 are organized according to the date when the associated position histories are recorded. Data for a photo taken on each date is added as additional information. Other than photos, image data (e.g., moving images or pictures) or sound data (e.g., music) acquired on each date may be used as additional information.

A movement history search image 80 of FIG. 14 includes a calendar 82 showing dates in a matrix. In each cell of the matrix, a thumbnail (shaded rectangles in the figure) of the photo taken on that date is displayed as indicated by a field 83 for "October". Photos may be displayed only for the month designated by the user via the command input acknowledgement unit 12. When the user selects an item "search by place" from a menu selection window 84 in the movement history search image 80 while one of the months is being selected, a search key input window 86 is displayed. As shown in the figure, the search key input window 86 is an area where the user enters character strings indicating the latitude and longitude of the center of the place that should be a search key, and the range (radius) of the place. This input information functions in the same way as the cursor 76 of FIG. 13. When the user enters a command input for performing a search, graphic forms for movement histories and various information are displayed as in FIG. 13. It is ensured, however, that only the movement history recorded in the month selected in the calendar 82 is subject to search.

In the case of FIG. 14, the user can narrow down movement histories subject to search by examining photos displayed on the calendar 82. The user examines photos to find the month in which the event that should be retrieved took place. When the user finds a photo taken at the time of the desired event in October, the user enters a search key, i.e., information on the place, while the month is being selected. Since a photographic image is useful to recall the memory of a human being, the user can arrive at a desired movement history efficiently by narrowing down movement histories using a photographic image. By associating the history with the date in the calendar, the search image can function as a diary or schedule manager.

Figure 15:
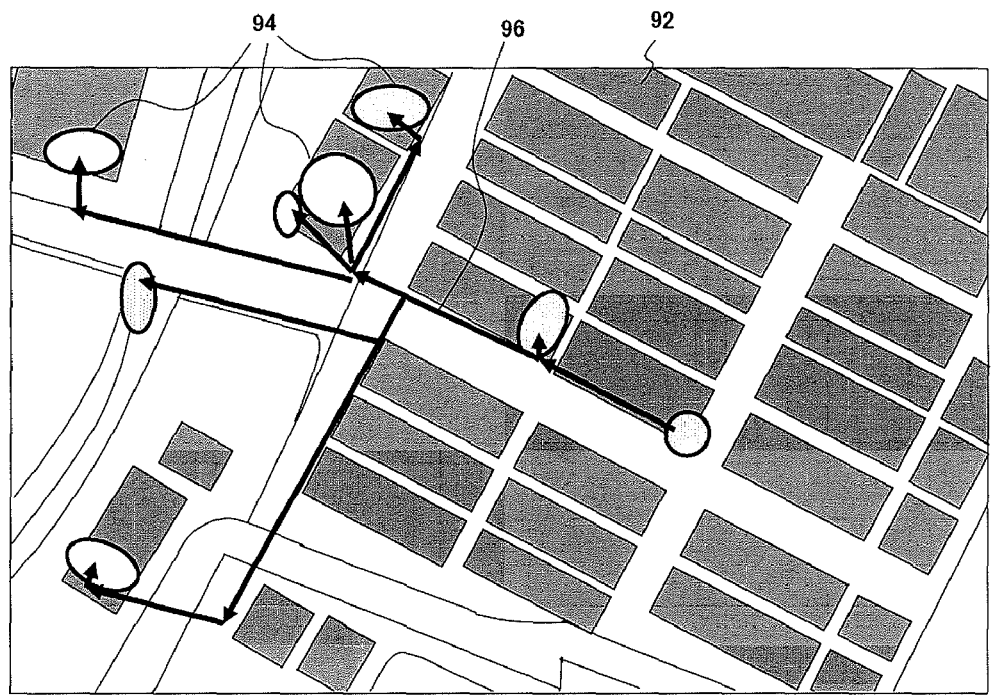
FIG. 15 shows another example of behavioral information generated by the behavioral information generation unit according to the first embodiment.

FIG. 15 shows another example of behavioral information generated by the behavioral information generation unit 16. In this example, a plurality of units of movement history of a single user stored in the movement history storage 24 are merged so as to generate new information related to places. The target of merge may be all movement histories stored in the movement history storage 24 or those movement histories originated from position histories recorded during a period of time designated by the user. When the user selects a desired area on the map or by entering a character string, the behavioral information generation unit 16 reads movement histories including places of stay located within the selected area from the movement history storage 24.

The places of stay in the plurality of units of movement history thus read and the routes to the places are all displayed in a single image. In a place of stop display image 90 of FIG. 15, a map 92 of the area selected by the user, graphic forms 94 showing places where the user stayed in the area in the past, and lines 96 showing the routes are displayed. Only one graphic form 94 is displayed if the plurality of units of movement history indicate that the user stayed in the same place. The same is true of the lines 96 showing routes. Alternatively, a threshold value may be defined for the frequency of visits so that places not so frequently visited and places frequently visited are displayed with different colors. The place of stop display image 90 of FIG. 15 is useful in itself in that it gives immediate understanding of the shops that the user dropped by in the past. In this embodiment, the information is exploited to produce added behavioral information.

For example, information on shops located within the area or in the neighborhood may be acquired from the information provider server 8 connected via the network. The information shown in FIG. 15 is used to pick up and display a list of shops that the user has not visited or to mark the shops on the map. Alternatively, shops of the same category as those frequented by the user and not visited by the user may be displayed as a list or displayed on the map, including those shops that are in the neighborhood. Frequently used routes may be taken into consideration in picking up shops. If information on those of the frequently visited shops that are running a sale or an event is acquired, the graphic form 94 may be highlighted in the place of stop display image 90 of FIG. 15 or character information may be added.

By acquiring and displaying information disclosed on the network based on the behavioral pattern of an individual, only the information that is likely to be useful for the user can be efficiently presented. The discussion above concerns generation of behavioral information based on the movement history of a single person. However, the approach may be applied to a plurality of persons.

Figure 16:
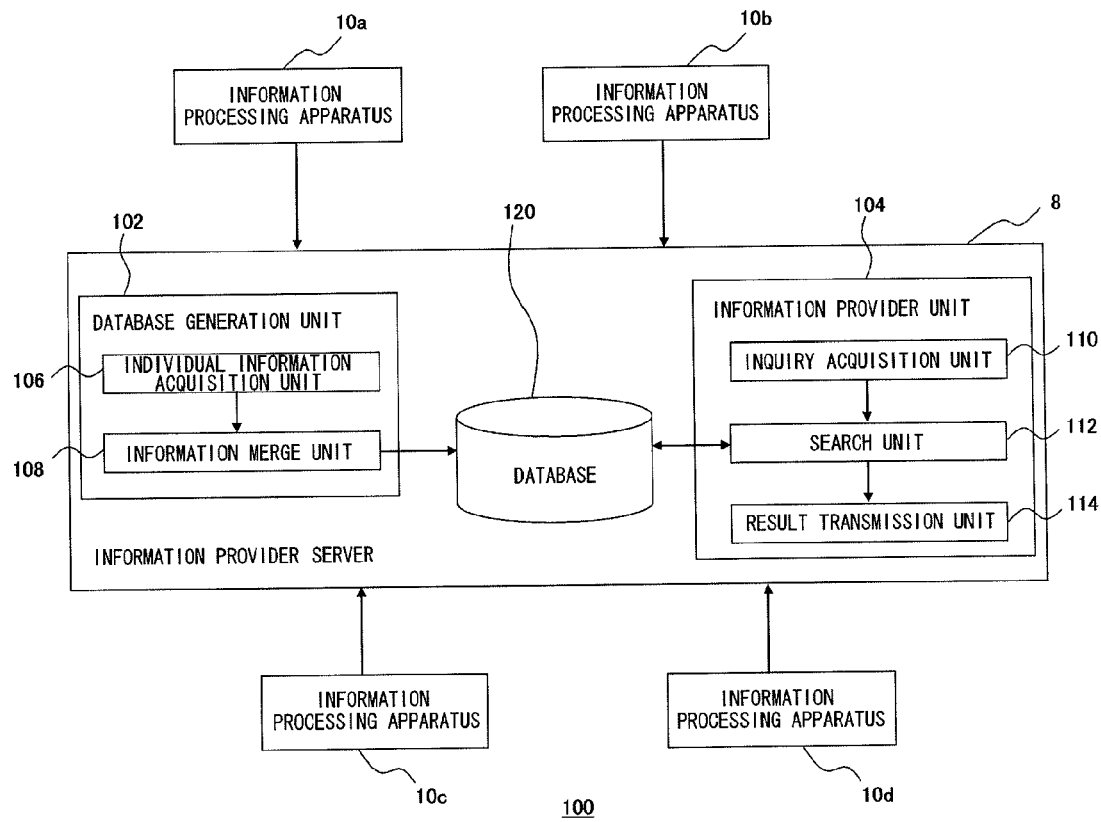
FIG. 16 shows the configuration of a system adapted to provide information based on the movement histories of a plurality of persons according to the first embodiment.

FIG. 16 shows the configuration of a system adapted to provide information based on the movement histories of a plurality of persons. An information provider system 100 comprises a plurality of information processing apparatuses 10a, 10b, 10c, and 10d, and the information provider server 8. The information processing apparatuses 10a, 10b, 10c, and 10d may have the same configuration as that of the information processing apparatus 10 shown in FIG. 2. The number of apparatuses may not be as shown in the figure. For example, as many apparatuses may be provided as the number of terminals used by users participating in a social networking service (SNS). The information provider server 8 is run by an operator of a community site and includes a database generation unit 102, a database 120, and an information provider unit 104.

The database generation unit 102 includes an individual information acquisition unit 106 for receiving predetermined items of movement histories transmitted from the plurality of information processing apparatuses 10a-10d, and an information merge unit 108 for merging the movement histories and storing the merged history in the database 120. The individual information acquisition unit 106 acquires, as a movement history, information on places of stay and movement routes of an individual. The information merge unit 108 merges the data for movement histories of a plurality of users for each area on a map. In this way, the behavioral information similar to that of FIG. 15 is acquired from the movement histories of a plurality of persons. Actual situation-based information (e.g., trip, walking, commute to work) unique to each movement history is added to the information transmitted from the information processing apparatuses 10a-10d. The information merge unit 108 merges the transmitted movement histories for each situation and stores the merged histories in the database 102.

The information provider unit 104 includes an inquiry acquisition unit 110 for receiving an inquiry related to presentation of information transmitted from the information processing apparatuses 10a-10d, a search unit 112 for acquiring necessary information from the database 120 according to the inquiry and placing the information in a predetermined format, and a result transmission unit 114 for transmitting the result to any of the information processing apparatuses 10a-10d originating the inquiry. The information processing apparatuses 10a-10d transmit an inquiry signal that includes information items that the user wishes to acquire (i.e., designation of an area, designation of a situation, a recommended shop, etc.)

The search unit 112 searches the database 120 for information in the movement histories that matches the area, situation, etc. included in the inquiry signal. Information retrieved as a result will be similar to the information shown in FIG. 15. However, the information is based on the movement histories of a plurality of persons and may include information on popular shops or back roads that are not so well known. By comparing the personal movement history transmitted from the user originating the inquiry with the retrieved information, popular places not visited by the user can be presented to the user. Information on the aforementioned score of interest may be added to the information as presented.

By way of another example, an average speed on a highway may be computed from a plurality of movement histories and categorized according to day of the week, time zone, season, etc. Thereby, traffic jam information at respective times can be presented. For example, when the user transmits an inquiry designating the route schedule to be used in a trip from the information processing apparatus 10a, the information provider server 8 transmits information on a place of traffic jam in the same route and in the same situation. The server 8 may retrieve from the database 120 a movement history that includes a route that passes through the starting point and endpoint of the place of traffic jam, and may transmit an alternate route and an average speed thereof.

Thus, by storing movement histories of a plurality of persons and providing information using the stored histories, popularity of shops, which is difficult to known by a search using the name, and information not so easily accessible by an individual can be acquired. The information thus provided is based on movement histories. This means that, instead of information on individual shops, information derived from larger perspectives, including movement routes and time zones, is available. As such, the information can be directly applied to creation of a trip itinerary, or detailed information broken down by time (e.g., the fact that a shop attracts customers at dinner time rather than at lunch time) can be obtained. Since the database is automatically updated as a person transmits a movement history, it is ensured that the latest information is provided.

According to the embodiment as described above, position histories recorded at predetermined time intervals are categorized into stay and movement according to the speed. The result of categorization is fed back to position coordinates in the position histories and segments of stay are merged as appropriate. Thereby, precision of categorization is improved and the places of stay are clearly defined. By clearly identifying segments of movement and segments of stay on a time axis as well as clearly identifying places of stay, the time flow of a person's activity is made known so that movement history information comprising a variety of items can be acquired. Information such as place, route, and time zone can be linked as a tag to a movement history, and, ultimately, to a personal event. As a result, efficient search is achieved and information management is facilitated. By converting a position history into a movement history, data can be aggregated and the data size is efficiently reduced.

Further, by generating categorization patterns using a plurality of speed threshold values, the abstraction level of places is changed depending on the information desired to be presented. For example, by switching the categorization pattern according to the scale of distance in presenting the movement history in a graphic form, the information as displayed can be adaptively varied only by designating a scale. As a result, the user can acquire desired information efficiently. By combining movement histories with information available on the network, various information related to places can be presented. By building a stock of movement histories of a plurality of persons and integrating information such as places of stay and routes, it is ensured that recommended places and traffic jam information are presented based on the latest information.

Second Embodiment

In the first embodiment, a movement history indicating places of stay and routes is generated by analyzing a position history. The movement history is visualized by displaying the history on a map etc. using a graphic form.
By switching to a pattern of segments of stay and segments of movement categorized according to a different speed threshold value in accordance with a change in the scale of the map displayed, the abstraction level of the place of stay is seamlessly switched according to the scale. The second embodiment is similar to the first embodiment in that places of stay and routes are displayed on a map. The difference is that the places of stay are hierarchized and the map scale and displayed area are switched according to the hierarchy level displayed. The information processing apparatus according to the embodiment is implemented by the configuration similar to the one described in the first embodiment with reference to FIG. 2. However, the configuration of the behavioral information generation unit 16 is different from that of the first embodiment. Hereinafter, illustration and description of those components that are the same as in the first embodiment are omitted as appropriate.

Figure 17:
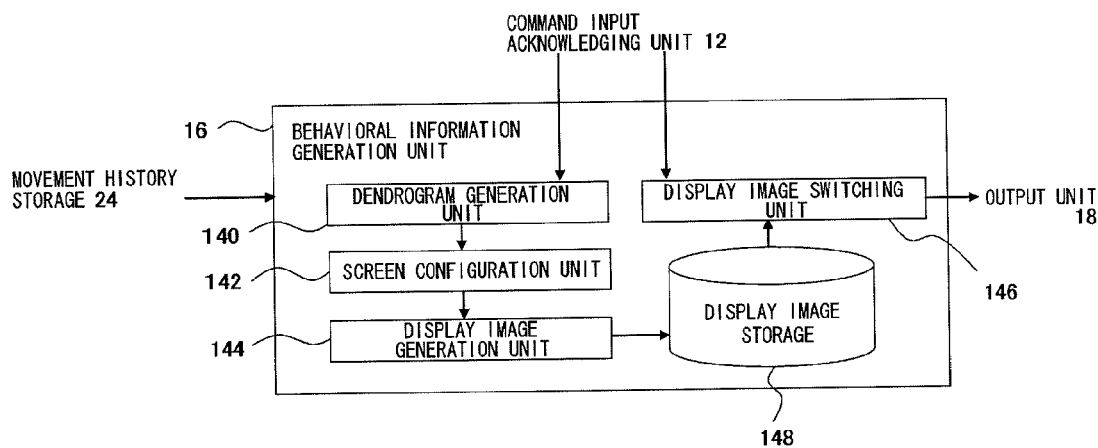
FIG. 17 shows the configuration of the behavioral information generation unit according to the second embodiment in detail.

FIG. 17 shows the configuration of the behavioral information generation unit 16 according to the second embodiment in detail. The behavioral information generation unit 16 includes a dendrogram generation unit 140 for generating a dendrogram based on places of stay in a movement history, a screen configuration determination unit 142 for determining the scale of a map displayed and the display area by referring to the places of stay displayed at a time, a display image generation unit 144 for generating data for a display image determined by the scale and the area displayed, a display image storage 148 for storing data for the display image thus generated, and a display image switching unit 146 for switching the image displayed in accordance with a command from the user.

The dendrogram generation unit 140 reads, from the movement history storage 24, a movement history designated by the user via the command input acknowledgement unit 12, and hierarchizes the places of stay by performing hierarchical clustering based on the place of stay and its position, duration, and time of day, and by generating a dendrogram. For this purpose, the maximum number N of places of stay displayed in a single screen, i.e., the cluster number, is predefined. A total of N clusters close to each other are merged so as to produce a cluster higher in the hierarchy. Given the position coordinates recorded in position histories, the distance between clusters is defined as i) the distance between the gravitational centers of the distributions of position coordinates included in respective clusters, ii) the physical distance between the contours of the graphic forms used to approximate the distributions, or iii) the temporal difference between the clusters. By repeating the above step, a dendrogram is completed. Clusters generated in this process are displayed on a map as places of stay using graphic forms.

The screen configuration determination unit 142 traces all the routes in the dendrogram generated by the dendrogram generation unit 140 from top to bottom. The unit 142 determines a necessary screen configuration by defining hierarchy levels so that N clusters are displayed at a time. In this process, the scale and display area of the image are determined so that the N clusters are accommodated in a screen at any hierarchy level. The display image generation unit 144 generates data for a display image comprising a map of the scale and display area determined by the screen configuration determination unit 142, and comprising graphic forms representing clusters. The unit 144 stores the data in the display image storage 148. The higher in the hierarchy, the more places of stay are merged so that the resultant map shows an extensive area.

The display image switching unit 146 reads the data for an initial image from the display image storage 148 and supplies the data to the output unit 18. The hierarchy level of the image used as the initial image is determined in advance. For example, the map at the top of the hierarchy, i.e., the map showing the most extensive area, may be used as the initial image. When user enters an input for selecting any of the clusters as displayed via the command input acknowledgement unit 12, the display is switched to an image where the clusters aggregated in the selected cluster and belonging to the hierarchy one level lower are displayed at a time.

Figure 18:
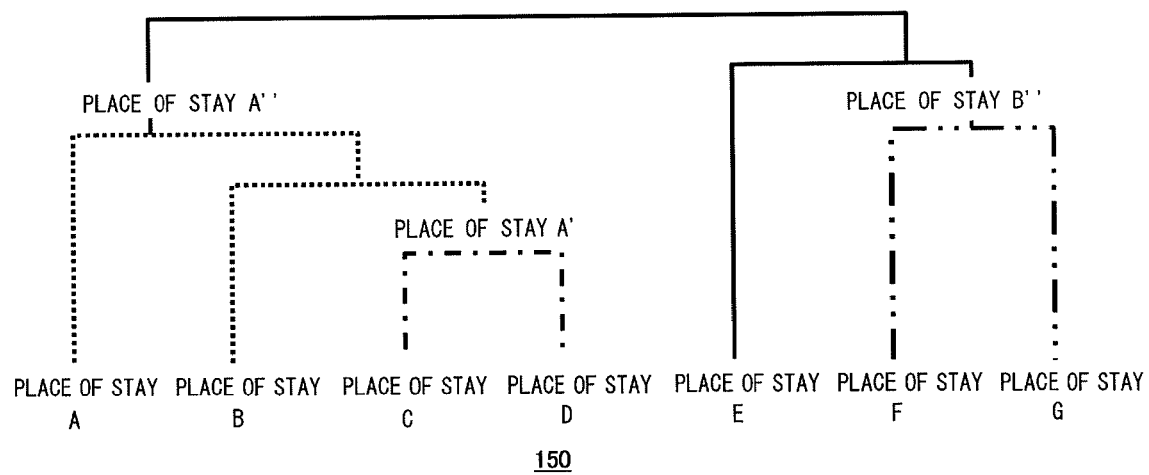
FIG. 18 shows the relation between the dendrogram and the display image according to the second embodiment.

FIG. 18 shows the relation between the dendrogram and the display image. In the following description, a cluster derived from aggregating a plurality of places of stay will also be referred to as a place of stay in the generic sense. A dendrogram 150 is generated based on a movement history including seven places of stay A, B, C, D, E, F, and G such that the number of places of stay displayed in a screen at a time is three. In this dendrogram, the places of stay C and D are aggregated to produce a place of stay A'. The place of stay A' and the places of stay A and B are aggregated to produce a place of stay A". Further, the places of stay F and G are aggregated to produce a place of stay B".

The first image, showing the most extensive area, shows three places of stay as indicated by solid lines, namely, the place of stay A", the place of stay E, and the place of stay B". When the place of stay A" is selected, the places of stay A and B, and the place of stay A' are displayed, as indicated by dotted lines. When the place of stay A' is selected, the places of stay C and D are displayed, as indicated by the chain lines. When the place of stay B" is selected, the places of stay F and G are displayed, as indicated by the chain double-dashed line. Therefore, by generating seven images corresponding to the places of stay A-G, and four images with a reduced scale and each showing three places of stay, the necessary scales and display areas are exhaustively covered.

Figure 19:
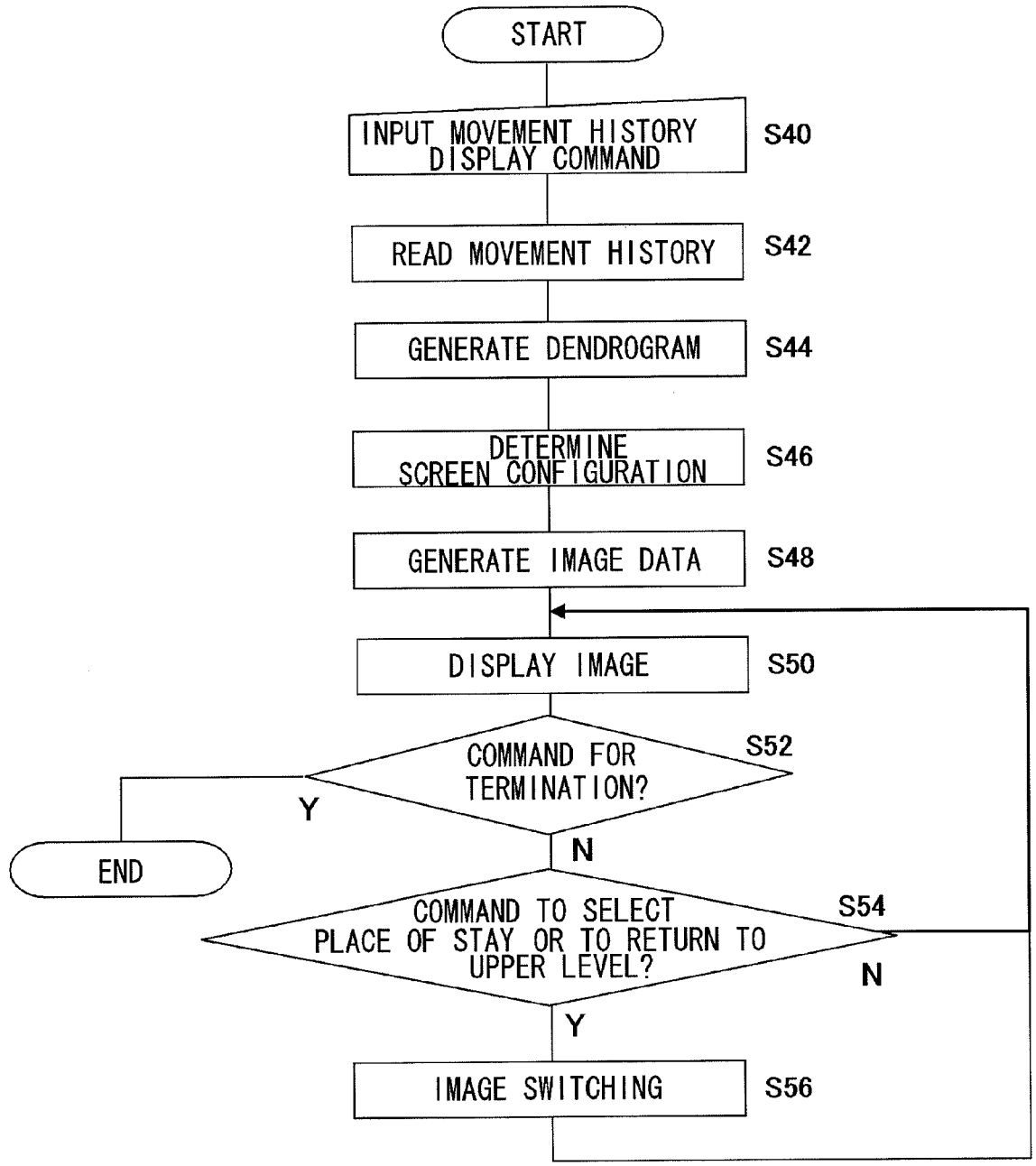
FIG. 19 is a flowchart showing steps to generate and display an image for showing a movement history according to the second embodiment.

A description will now be given of the operation using the configuration as described above. FIG. 19 is a flowchart showing steps to generate and display an image for showing a movement history. When the user enters a command requesting the display of a movement history along with the designation of a file storing the history via the command input acknowledgement unit 12 (S40), the dendrogram generation unit 140 reads the file for the movement history from the movement history storage 24 (S42), performs hierarchical clustering based on the relative positions of the places of stay recorded in the history, and generates a dendrogram accordingly (S44).

The screen configuration determination unit 142 traces the dendrogram from top to bottom and determines the relation between images and hierarchies as needed such that the maximum number of places of stay displayed in a single image is N. The unit 142 also determines the scale of the images such that the places of stay in the respective images are all accommodated in an area around the center of the image occupying an area defined by a predetermined ratio (S46). Since the image at the bottom of the hierarchy shows only one place of stay, the scale of the image is determined such that the distribution of position coordinates included in the associated segment of stay and recorded in the position history, or the graphic form used to approximate the distribution are accommodated in an area around the center of the image using a predetermined ratio. The display image generation unit 144 acquires the information, generates the data for the images corresponding to the respective hierarchy levels, and stores the data in the display image storage 148 (S48). In this process, the data for the map used may be downloaded via the network.

The display image switching unit 146 reads the data for the initially displayed image at the top of the hierarchy from the display image storage 148 and displays the image accordingly (S50). By ensuring that the image data at the top of the hierarchy is generated first in S48, the display image switching unit 146 can start the displaying step of S50 while the display image generation unit 144 is generating subsequent image data in the background. If the user does not enter a command to terminate the display and enters a command to select one of the graphic forms for the places of stay included in the display image (N in S52, Y in S54), the display image switching unit 146 switches the display to an image of the layer underlying the selected place of stay in the hierarchy (S56, S50).

While a place of stay is not selected by an input, the same image continues to be displayed (N in S54, S50). The steps S50 through S56 are repeated until the user enters a command to terminate the display (N in S52, S54, S56, S50). When a command to terminate the display is provided, the process is terminated (Y in S52). While an image other than the image at the top of the hierarchy is being displayed, a command to return to the image one level upper in the hierarchy is acknowledged in S54. For this reason, a diagram that lets the user know of the dendrogram and the hierarchy may be displayed on the image so that the user can provide an input to select the upper hierarchy level. Alternatively, a button of the input acknowledgement unit 12 (not shown) may be assigned such a function.

When user-initiated change in scale or scrolling of display area is enabled in an application that involves displaying of a map, the operation to change the scale and the operation for scrolling of the display area are generally independent. Therefore, if the user wishes to view a desired area at a desired scale, the user has to adjust both the area in view and the scale while viewing the screen. Quite often, this could result in an area different from the intended area being displayed as the scale is increased, or the desired area being lost from view.

In particular, where network connection is established to download image data for a map, various processes for displaying a new image are required each time the user makes fine adjustment, requiring a certain period of time before a new image is displayed since the user operation. Depending on the processing capabilities of the device or network conditions, the time elapsed would be intolerable, causing stress for the user.

As mentioned before, this embodiment focuses on the place of stay in a movement history, so that, by clustering and hierarchizing the places according to the number and relative positions thereof, the display area and scale whereby the places of stay are displayed in a balanced manner are determined in advance. By ensuring that an image of underlying layer in the hierarchy when a place of stay is selected, the display can be directly switched to the scale and display area as desired by the user. Since the display image is defined in advance, steps required for switching the display are reduced and it is ensured that a time lag is unlikely to occur, by downloading image data in advance and generating a display image independently of the switching process.

Figure 20:
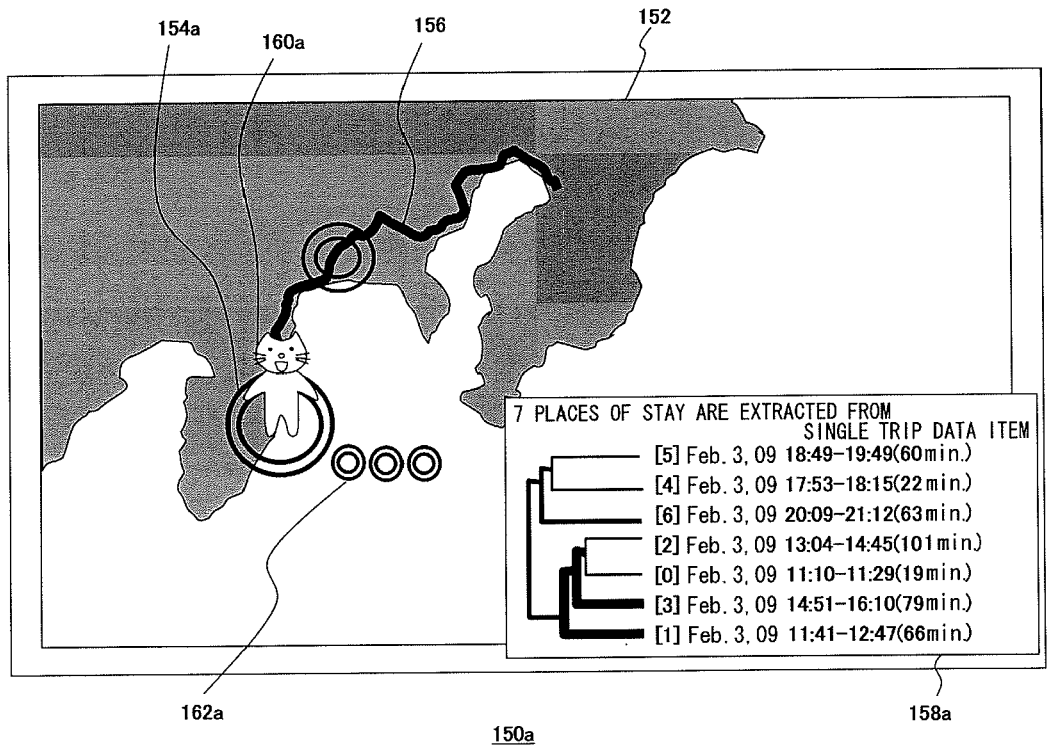
FIG. 20 shows an exemplary image actually displayed according to the second embodiment.
Figure 21:
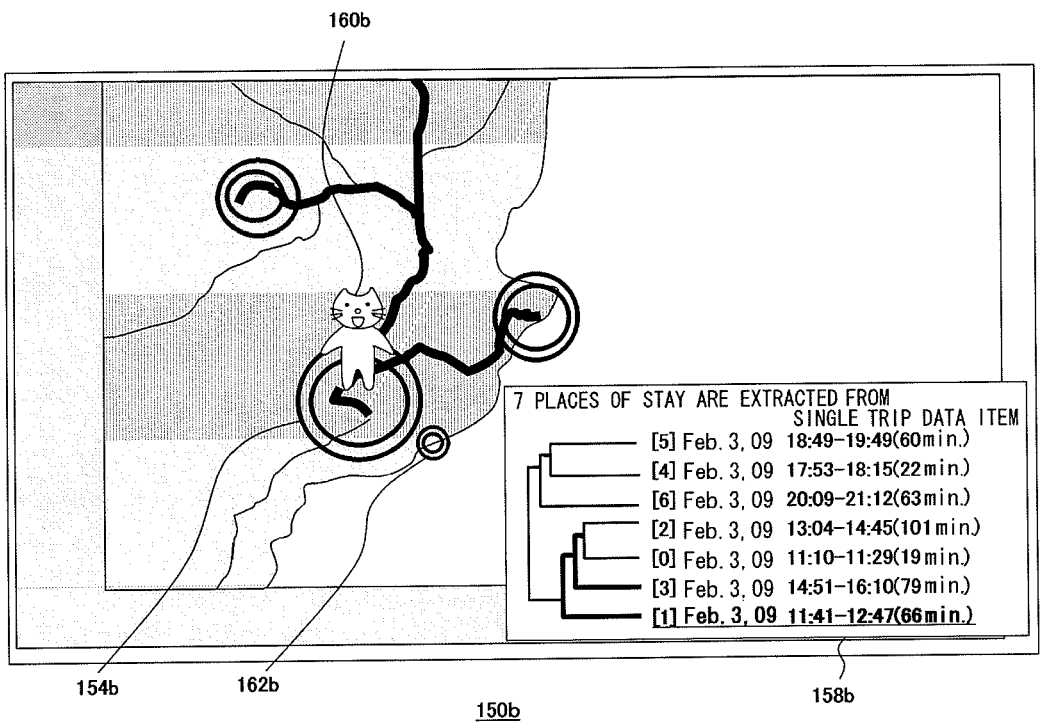
FIG. 21 shows an exemplary image actually displayed according to the second embodiment.
Figure 22:
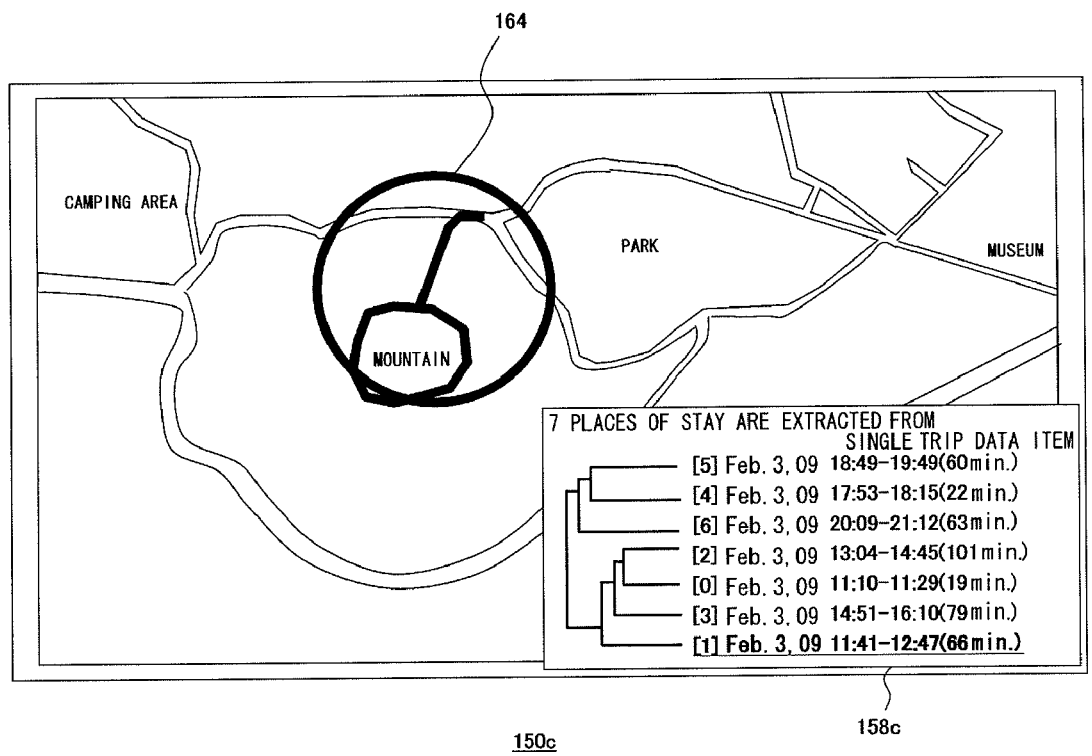
FIG. 22 shows an exemplary image actually displayed according to the second embodiment.

FIGS. 20 through 22 show exemplary images actually displayed. These examples show movement histories in a single trip. A speed threshold value of 25 km/h is used to categorize segments of stay/movement. According to the categorization, a walking speed or less is identified as a stay, and the higher speed is identified as movement by a vehicle, etc. As mentioned above, the maximum number of places of stay displayed in a single screen is three, and the map scale is determined such that the places of stay displayed in a single screen are accommodated in an area occupying 75% of the area around the center of the image.

A hierarchized movement history display image 150a of FIG. 20 is the image at the top of the hierarchy and shows double circles 154a representing places of stay and bold-lined graphic forms 156 representing movement routes on a map 152. The method of display is as described in the first embodiment. The hierarchized movement history display image 150a further includes a dendrogram display field 158a. The dendrogram display field 158a shows a dendrogram resulting from categorizing the places of stay by hierarchical clustering. Each leaf node of the dendrogram corresponds to a minimum unit of place of stay included in the movement history. Information related to the stay (e.g., date and time of stay, duration of stay, etc.) is read from the movement history and displayed.

The layer corresponding to the hierarchized movement history display image 150a of FIG. 20 is explicitly indicated by using a bold line in the dendrogram in the dendrogram display field 158a. Alternatively, the color of the line may be changed. Referring to the figure, the cluster comprising an aggregate of the places of stay [0], [1], [2], [3], the place of stay [6], and the cluster comprising an aggregate of the places of stay [4] and [5] are displayed as three places of stay. The hierarchized movement history display image 150a also shows a character 160a that can be moved by the user via the command input acknowledgement unit 12. The character is used to, for example, select a place of stay.

In the condition of FIG. 20, the character 160a is located in the place of stay indicated by the double circle 154a. The boldest line in the dendrogram display field 158a indicates which layer in the dendrogram the place of stay corresponds to. In this example, the character shows that the cluster comprising an aggregate of the places of stay [0], [1], [2], and [3] is being selected. The forms representing the number of clusters in the underlying layer is displayed in the neighborhood of the place of stay being selected. In the example of FIG. 20, three small double circles 162a indicate that the number of clusters in the underlying layer is 3. This represents the cluster comprising the place of stay [1], the place of stay [3], and the cluster comprising an aggregate of the places of stay [0] and [2].

When the user enters a command to confirm the selection in this stated, the image shown in FIG. 21 is displayed. The map shown in a hierarchized movement history display image 150b of FIG. 21 shows the neighborhood of the place of stay selected in FIG. 20. As described above, the map is scaled such that the clusters in the underlying layer of the selected place of stay are accommodated in an area occupying 75% of the total image. The method of displaying the hierarchized movement history display image 150b is the same as that of the hierarchized movement history display image 150a of FIG. 20. The image 150b shows the place of stay [1], the place of stay [3], and the cluster comprising an aggregate of the places of stay [0] and [2]. Therefore, the corresponding layer in a dendrogram display field 158b is indicated by bold lines.

Of the places of stay displayed, the place of stay indicated by a double circle 154b where a character 160b is currently located represents a minimum unit of place of stay instead of a cluster comprising an aggregate of a plurality of places of stay. Therefore, the fact that there is only one cluster in the underlying layer is indicated by the number of small double circles 162b. Information on the corresponding place of stay is indicated by underlining and in boldface type in the dendrogram display field 158b. When the user enters a command to confirm the selection, the image shown in FIG. 22 is displayed.

A hierarchized movement history display image 150c of FIG. 22 shows the neighborhood of the place of stay selected in FIG. 21. As described above, since the image includes a minimum unit of place of stay, the map as displayed is scaled such that the distribution of position coordinates included in the segment of stay corresponding to the place of stay and recorded in the position history are accommodated in an area occupying 75% of the total image. The method of display is as described with reference to FIGS. 20 and 21. However, the place of stay is indicated by a single circle 164 because it is a minimum unit of place of stay. Information on the corresponding place of stay is indicated by underlining and in boldface type in a dendrogram display field 158c.

According to the second embodiment, when the user selects one of places of stay included in an image higher in the hierarchy, a map having a display area and a scale such that the places of stay of the layer underlying the selected place of stay are accommodated in a predetermined range, as described above. The map may be displayed as being viewed from above or diagonally. The user or the system may configure the viewing direction as desired. Therefore, by generating a dendrogram, necessary map data is specifically determined. The display image switching unit 146 may deal with the plurality of maps thus determined independently and switch between the maps for display. Alternatively, image switching may be effected such that the images are merged into a single image and the viewpoint is switched.

Figure 23:
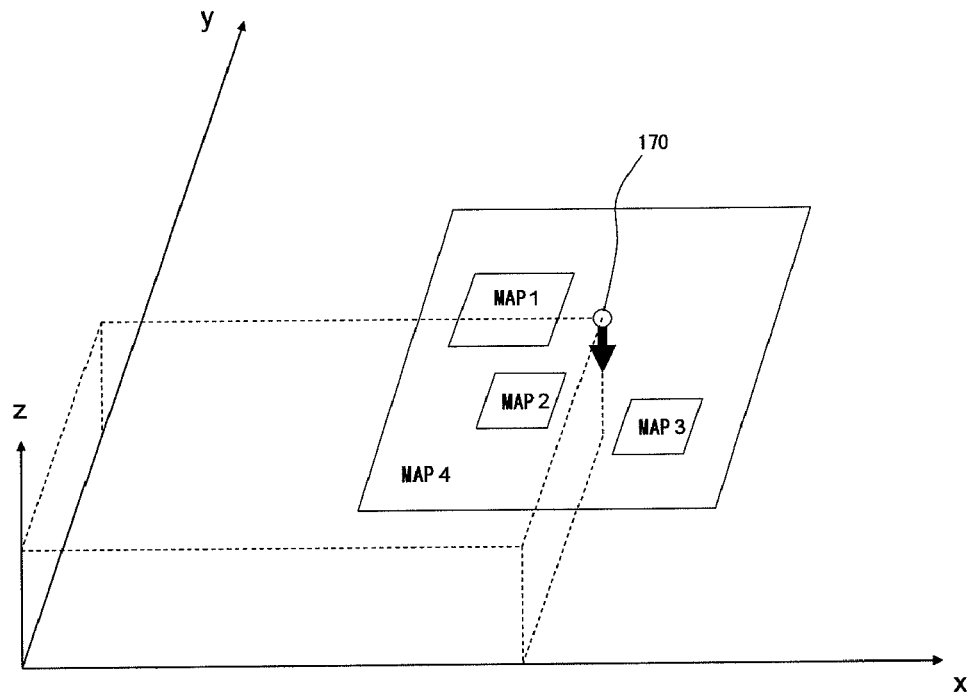
FIG. 23 shows a relation between the images and the viewpoint occurring when the images are merged into a single image and the viewpoint is switched according to the second embodiment.

FIG. 23 shows a relation between the images generated in this case and the viewpoint. Referring to the figure, "map 4" denotes an image at the top of the hierarchy, "map 1", "map 2", and "map 3" are images in the underlying layer. As mentioned above, each of "map 1", "map 2", and "map 3" shows a particular place in "map 4" at an increased scale. Therefore, areas corresponding to "map 1", "map 2", and "map 3" are located in "map 4". Thus, as shown in the figure, "map 1", "map 2", and "map 3" which are the maps in underlying layer are pasted onto the corresponding areas on "map 4" which is the map in the higher level in the hierarchy.

"Map 1", "map 2", and "map 3" are large-scale maps and so show information more detailed than the information in the corresponding area on the map 4. Therefore, the pasting operation creates a map in which selected places are shown in detail. A viewpoint 170 is established for the map thus created. The viewpoint the field of view of which overlaps the entirety of "map 4", which is an image at the top of the hierarchy and is displayed as an initial image, is defined by the x-coordinate, y-coordinate, which are defined in an image plane, and z-coordinate, which indicates the height of the viewpoint. Similarly, viewpoints are defined for "map 1", "map 2", and "map 3" such that the entirety of each image overlaps the field of view from the viewpoint. The z-coordinates of the viewpoints used for display of "map 1", "map 2", and "map 3" are smaller than the z-coordinate of the viewpoint used for display of "map 4".

Data for the single image and the coordinates of the viewpoints corresponding to the respective maps are stored in the display image storage 148. The display image switching unit 146 implements image switching as change in the viewpoint to view the single image from. When the movement of the viewpoint is completed, graphic forms of the corresponding places of stay, etc. are superimposed on the map. Technologies commonly used in the field of, for example, computer graphics may be used to determine a display image by defining a viewpoint. By switching the image using the movement of the viewpoint, the unit 146 can make it appear that the user is zooming in on the place of stay selected in an image higher in the hierarchy. As a result, seamless and natural image switching is achieved.

As described above, the second embodiment is adapted for a mode where places of stay and movement routes are displayed on a map such that minimum units of places of stay are categorized by hierarchical clustering so as to generate a dendrogram. The scales and display areas of maps are determined based on the number of clusters displayed in a single image and their positions so that the data for images to be displayed are generated in advance. When one of the places of stay is selected while an image is being displayed, the display is switched to an image that includes places of stay in the underlying layer aggregated in the selected place of stay and has a scale adapted for the display of the places. With such an arrangement, the user can easily switch the display to a desired scale and a desired display area. Since the data for the display image can be determined in advance, it is not necessary to download image data each time the scale or the display area is changed, resulting in highly responsive display.

Data for a single image may be generated where maps showing places in the underlying layer are pasted onto a map showing places in the upper layer. For switching of the image, the viewpoint to view the single image from is moved. This allows seamless image transition using image data of the minimum size even if a change in the scale of the display area is requested.

Third Embodiment

In the first and second embodiments, a movement history is derived from a position history. The movement history is visualized on a map using a graphic form, etc. This embodiment is adapted to create a slideshow where photos selected from a plurality of photos taken during a trip, etc. are automatically switched and displayed sequentially, or moving images played back with effects or BGM attached, wherein photos, etc. displayed are selected using movement history information. Since the selected photo is linked to the movement history, the photo can be displayed along with the image of the movement history. The information processing apparatus according to this embodiment is implemented by the configuration similar to the one described in the first embodiment with reference to FIG. 2. However, the configuration of the behavioral information generation unit 16 is different from that of the first and second embodiments. Hereinafter, illustration and description of those components that are the same as those in the first and second embodiments are omitted as appropriate.

Figure 24:
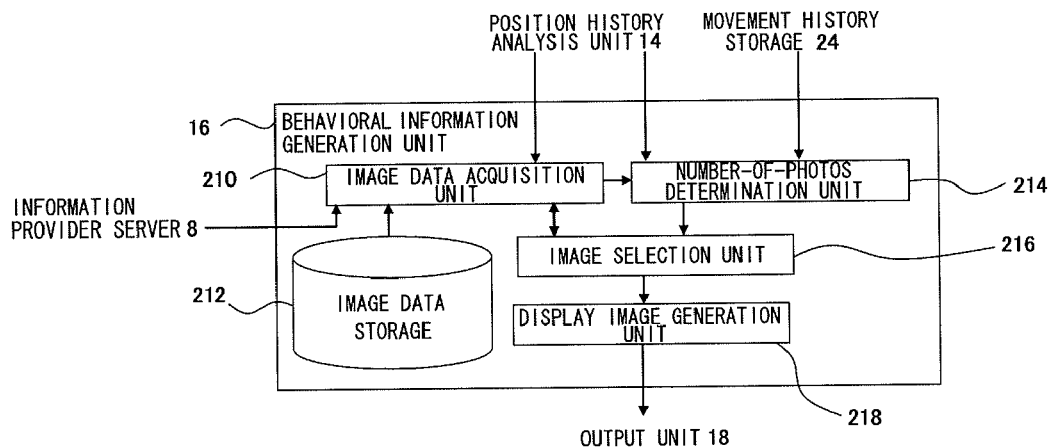
FIG. 24 shows the configuration of the behavioral information generation unit according to the third embodiment in detail.

FIG. 24 shows the configuration of the behavioral information generation unit 16 according to this embodiment in detail. The behavioral information generation unit 16 includes an image data acquisition unit 210 for acquiring image data for photos designated by the user, an image data storage 212 for storing image data for a photo taken by the user; a number-of-displayed-photos determination unit 214 for determining the number of photos by referring to the movement history designated by the user, an image selection unit 216 for selecting the number of photos determined and extracting data; and a display image generation unit 218 for generating data for a display image that includes the photos, movement history, etc.

The image data acquisition unit 210 reads, from the image data storage 212, data for a series of photos designated by the user via the command input acknowledgement unit 12 by designating files. The image data acquisition unit 210 further acquires image data from the information provider server 8 as needed. The number-of-displayed-photos determination unit 214 reads, from the movement history storage 24, the movement history corresponding to the photo data designated by the user via the command input acknowledgement unit 12. The unit 214 is also adapted to read position information provided as additional information attached to the photo. The unit 214 determines the number of photos to be displayed in each segment of stay and segment of movement, in consideration of the segments of stay and segments of movement occurring in a time axis between the start and end of the movement history.

For determination of the number of photos, importance of each stay/movement, relative duration of each segment, number of photos taken during each segment are considered. For this purpose, the number-of-displayed-photos determination unit 214 acquires the time of day that each photo is taken from the image data acquisition unit 210. The time of day forms the additional information attached to the photo data. Based on the start time and end time of each segment in the movement history and on the time of day that the photo is taken, the unit 214 identifies the number of photos taken during each segment. A specific method of determining the number of photos to be displayed in each segment using such parameters will be described later.

The image selection unit 216 arranges the plurality of photos acquired by the image data acquisition unit 210 in the order of time and selects a photo to be displayed from the photos taken during each segment, in accordance with the determination by the number-of-displayed-photos determination unit 214. Selection is made considering the contents of the photos. For example, balance between portraits and landscape photos, and information such as situation of photographing attached to the photo data are considered. The display image acquisition unit 218 acquires the data for the selected photos from the image selection unit 216, frames the photo or applies effects such as crossfade, and sequentially outputs the photographic images to the output unit 18. In this way, moving images formed of the selected contents are presented on the display screen of the output unit 18.

The display image generation unit 218 may not only display selected photos sequentially but may display the photos along with the movement history as illustrated later. In other words, since the photos are selected in each segment of the movement history according to this embodiment, correspondence is established between the photos and the places of stay and movement routes in the movement history. Therefore, the correspondence can be taken advantage of to simultaneously display a slideshow and a movement history easily.

Figure 25:
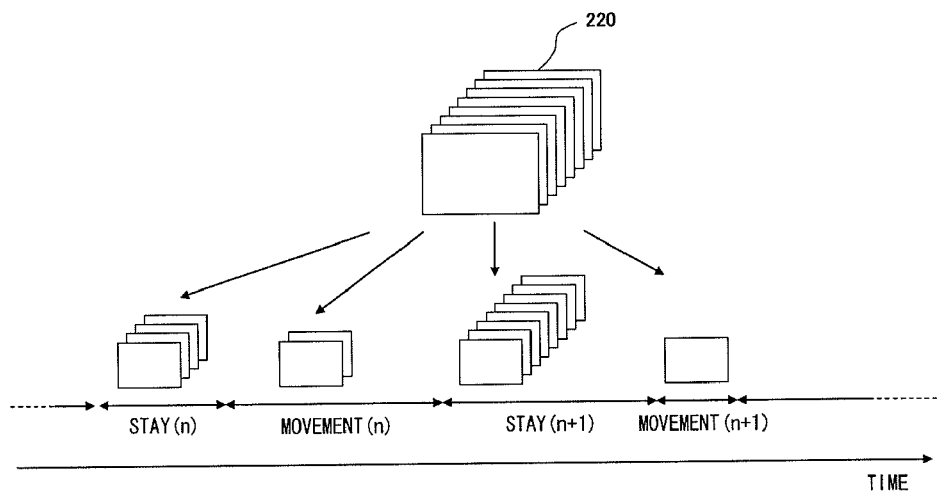
FIG. 25 shows a method of determining the number of photos to be displayed in each segment on a time axis in a movement history according to the third embodiment.

A description will now be given of how the number-of-displayed-photos determination unit 214 determines the number of photos to be displayed. FIG. 25 shows a method of determining the number of photos to be displayed in each segment on a time axis in a movement history. Referring to the figure, the horizontal direction represents a time axis, and segments of stay and segments of movement alternate such that n-th segment of stay (stay (n)), n-th segment of movement (movement (n)), n+1-th segment of stay (stay (n+1)), n+1-th segment of movement (movement (n+1)), . . . etc. Meanwhile, the image data storage 212 stores image data for a plurality of photos 220 in the order, for example, that the photos are taken.

Association between a person's behavior and photos, which is difficult to ascertain based on the contents of the photos, is established by dividing the photos into the respective segments of the movement history according to the time of day that the photo is taken. By selecting photos to be displayed from each segment, a slideshow giving an appearance of temporal continuity can be presented without creating an abrupt jump from a photo of a place of stay to a photo of another place of stay even if a total display time is limited.

First of all, the total number of photos N_all is determined from a predefined total display time of a slideshow and a display time per a photo. Meanwhile, the ratio l_move, indicating the proportion of the number of photos displayed for segments of movement, and, l_stay, indicating the proportion displayed for segments of stay are defined. It should be noted that l_move+l_stay=1. The proportion T(n) of the duration of each segment relative to the total time of the movement history is derived from the movement history, and the proportion of the number of photos S(n) taken during each segment relative to the total number of photos taken is derived from the photo data. Using these parameters, the number of photos N_move(n) displayed for the n-th segment of movement and the number of photos N_stay(n) displayed for the n-th segment of stay are determined as follows.

$$N\_move(n)=N\_all \times l\_move \times \alpha \times T(n) \times \beta \times (m+S(n))$$

$$N\_stay(n)=N\_all \times l\_stay \times \alpha \times T(n) \times \beta \times (m+S(n))$$

where α and β are coefficients of weighing the parameters T(n) and S(n). By varying the coefficients relative to each other, adjustment can be made as to which of i) the proportion of the duration of each segment or ii) the number of photos taken during each segment is given preference in determining the number of photos displayed. m indicates a constant that ensures that the number of photos displayed is not 0 even when the number of photos S(n) taken is 0. When a fraction is generated, the number of photos displayed in the segment with the maximum number of photos taken is incremented by 1 and the fraction is discarded in the other segments, because the number of photos displayed is a natural number.

Figure 26:
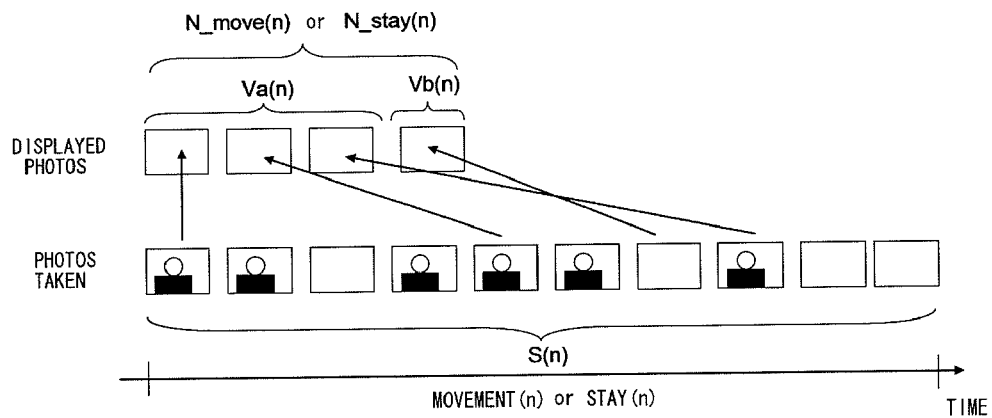
FIG. 26 describes a method of selecting a predetermined number of photos from the photos taken during a segment in a movement history according to the third embodiment.

A description will now be given of how the image selection unit 216 selects a photo to be displayed. FIG. 26 describes a method of selecting a predetermined number of photos from the photos taken during a segment in a movement history. Referring to the figure, the horizontal direction represents a time axis and shows only a given segment, i.e., a segment of movement "movement (n)" or a segment of stay "stay (n)". The lower part of the figure shows a sequence of photos taken during the segment. The number of the photos corresponds to S(n) in the expression above. The upper part of the figure shows a sequence of selected photos. The number of the selected photos corresponds to N_move(n) or N_stay(n) determined by the number-of-displayed-photos determination unit 214.

If photos are selected according to a predetermined rule merely based on the order of sequence of photos such that every second photo is selected, or photos are selected randomly by generating a random number, selection disregarding the contents of photos would result in selection of photos that the user may not desire so much. By its nature, a slideshow desirably includes a balanced selection of photos capturing important aspects of an event such as a trip. Thus, this embodiment ensures that portraits and landscape photos are displayed in a balanced manner by categorizing the photos into photos capturing a person and the other photos.

For this purpose, facial detection is performed on the photos in the lower part of FIG. 26 using a facial recognition technology. Photos where a face is detected are categorized as portraits and the other photos are categorized as non-portraits. In the case of photos taken during a trip, many of the non-portraits are landscape photos. Meanwhile, the proportion H ($0 \leq H \leq 1$) of portraits in the entire photos displayed is predefined. The value may be fixed in the information processing apparatus 10 or may be adjusted by the user. The number of portraits Va(n) displayed in a segment and the number of non-portraits Vb(n) displayed are determined as follows.

$$Va(n)=H \times (N\_move(n) \text{ or } N\_stay(n))$$

$$Vb(n)=(1-H) \times (N\_move(n) \text{ or } N\_stay(n))$$

A fraction may be counted as one shot and assigned to one of the categories or discarded. The image selection unit 216 selects portraits and non-portraits so that the ultimate numbers are Va(n) and Vb(n). For this purpose, the following process is applied to the portraits and non-portraits. First, two of the photos in the sequence that are closest to each other in time are picked up and compared. One of the photos is eliminated from the selection based on a determination as to the level of visual beauty. If there is another pair of photos as close to each other as the first pair, one of the second pair is eliminated from the selection as a result of comparison. Two of the photos remaining in the stock and closest to each other in time are picked up and one of the pair is eliminated from the selection.

These processes are repeated until there remain as many as Va(n) or Vb(n) photos. Since the photos close to each other in time are likely to have similar compositions, photos of similar compositions are prevented from being selected in a duplicated manner by eliminating photos from the selection in this way. Additionally, such an approach enables selection that is unbiased in respect of time.

Determination as to the level of visual beauty grades the contents of photos according to a predetermined index. When a plurality of indices are used, photos are rated according to a predetermined rule with reference to the indices so that total scores are counted and compared. In the case of portraits, for example, the result of facial recognition is used to extract portraits. The higher the proportion of the total area of face facing the front in a screen, the higher the score. By also rating the photos according to the number of faces facing the front, i.e., the number of people captured, adjustment is possible whereby photos showing a lot of people and showing their faces on an enlarged scale or photos showing a smaller number of people, given the same total area occupied by the faces, are scored high. It may be ensured that as many people as possible appear in the selection in an unbiased manner by referring to attributes such as race, sex, age, etc. obtained as a result of facial recognition.

Instead of using the result of facial recognition, additional information attached to the photo data (e.g., exposure value, shutter speed, angle of field, etc.) may be used. For example, by assigning high scores to photos with a higher shutter speed, the likelihood of selecting photos without motion blur can be increased. By assigning high scores to wide-angle non-portraits, the likelihood of selecting landscape photos can be increased. As described, rules for scoring portraits and non-portraits may differ.

If the number of taken non-portraits is less than the predefined number of non-portraits displayed Vb(n), the image selection unit 216 notifies the image data acquisition unit 210 accordingly, whereupon the image data acquisition unit 210 may download photos available for a charge or without charge from the information provider server 8 using a predetermined procedure. Alternatively, the unit 210 may read photos from a collection of contents maintained offline. In this process, it is preferable that the image data acquisition unit 210 acquire photos suitable for the segment by referring to the movement history or position history and designating, for example, the latitude and longitude of position coordinates included in the segment that is deficient in photos.

Therefore, it is preferable that the information provider server 8 be provided with a database where photos are categorized according to the location (e.g., latitude and longitude). Categorization may not be as detailed as described above where the latitude, longitude, etc. are used. It would be equally advantageous if a search can be made for photos over the network based on the name of place or premises mapped into each segment of the movement history and if the photos identified by the search can be retrieved. Photos acquired from the information provider server 8 may be used to compensate the lack of photos when the number of portraits taken is less than the predefined number of portraits displayed Va(n).

Figure 27:
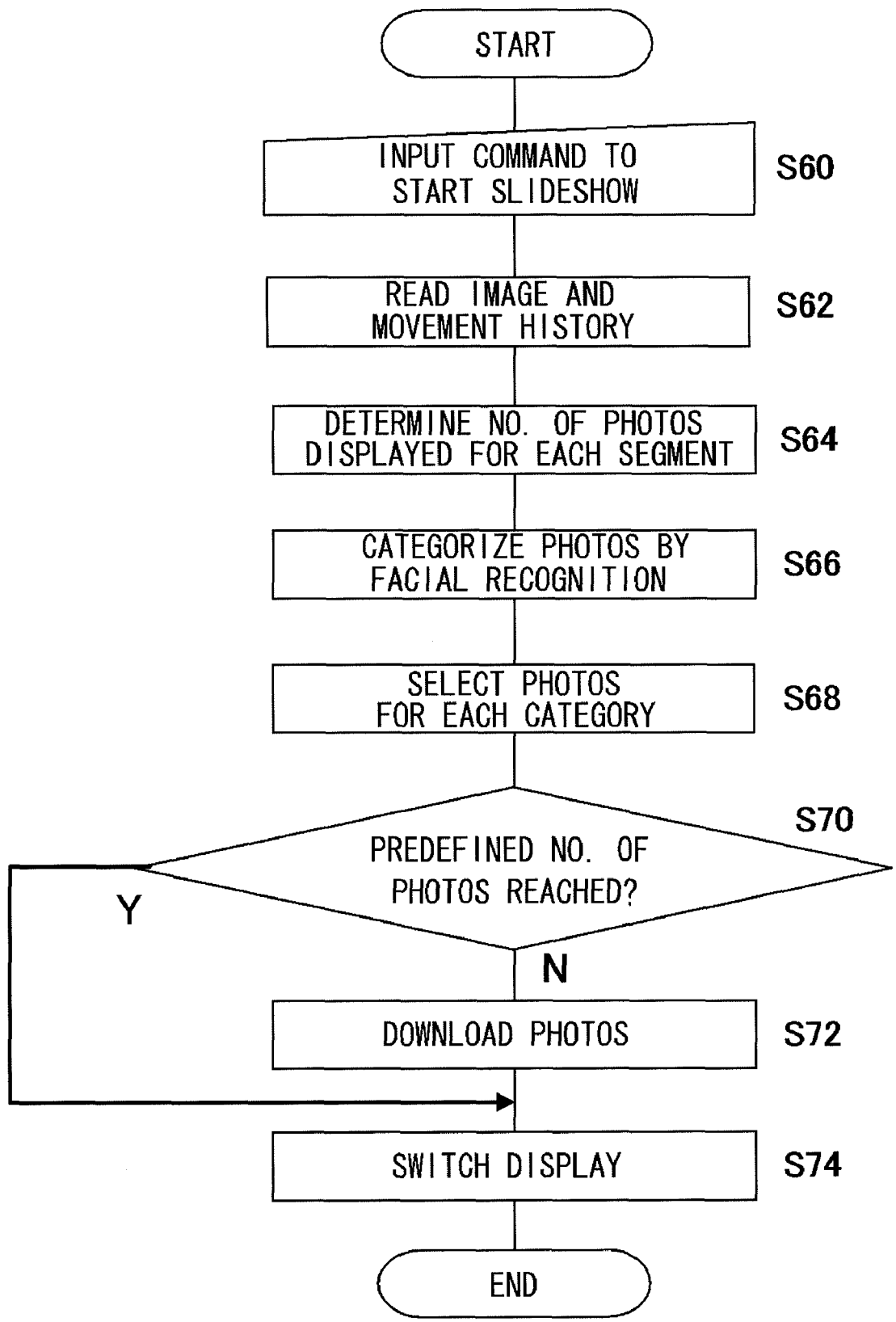
FIG. 27 shows steps to create a slideshow using photos in such a manner that the photos accompany movement history information according to the third embodiment.

A description will now be given of the operation using the configuration as described above. FIG. 27 shows steps to create a slideshow using photos accompanying movement history information. When the user designates a movement history and the data for photos taken during the movement and enters a command requesting the start of a slideshow via the input acknowledgement unit 12 (S60), the image data acquisition unit 210 and the number-of-displayed-photos determination unit 214 read the data for the designated photos and the movement history from the image data storage 212 and the movement history storage 24, respectively (S62). The number-of-displayed-photos determination unit 214 determines the number of photos displayed for each segment of stay and segment of movement included in the movement history as mentioned above (S64).

The image selection unit 216 then acquires the photo data subject to processing from the image data acquisition unit 210 and subjects all photos to facial recognition, categorizing the photos into portraits and non-portraits (S66). The unit 216 selects photos, for each segment, from each category such that the ratio between the portraits and the non-portraits matches a predetermined value (S68). If the number of photos taken is less than the predefined number of displayed photos defined for that segment (N in S70), the image selection unit 216 notifies the image data acquisition unit 210 accordingly, whereupon the image data acquisition unit 210 downloads a deficient number of photos from the information provider server 8 based on the position information of the segment (S72).

When the photos to be displayed are made available (Y in S70 or S72), the display image generation unit 218 generates images in which the photos are switched in the order of time of photographing and outputs the images to the output unit 18. As a result, a slideshow is displayed (S74). For a presentation purpose, photos in a given segment may be displayed in an order different from the order of photographing. For example, the order may be rearranged so that portraits and landscape photos are displayed alternately.

Examples of display images generated by the display image generation unit 218 will now be shown. In this example, the map of a movement history described in the second embodiment is utilized. A true-to-experience presentation is given by displaying the selected photos in the slideshow format, synchronizing the display with a character moving on the map to follow the history. As mentioned above, photos are selected in this embodiment in association with each segment in a movement history. Thus, it is easy to launch a slideshow coordinated with a movement history. However, the embodiment may be implemented in other manners. Only selected photos may be displayed such that the photos are switched at predetermined intervals. Instead of a map, any graphical presentation showing geography (e.g., illustration or aerial photo) may be used.

Figure 28:
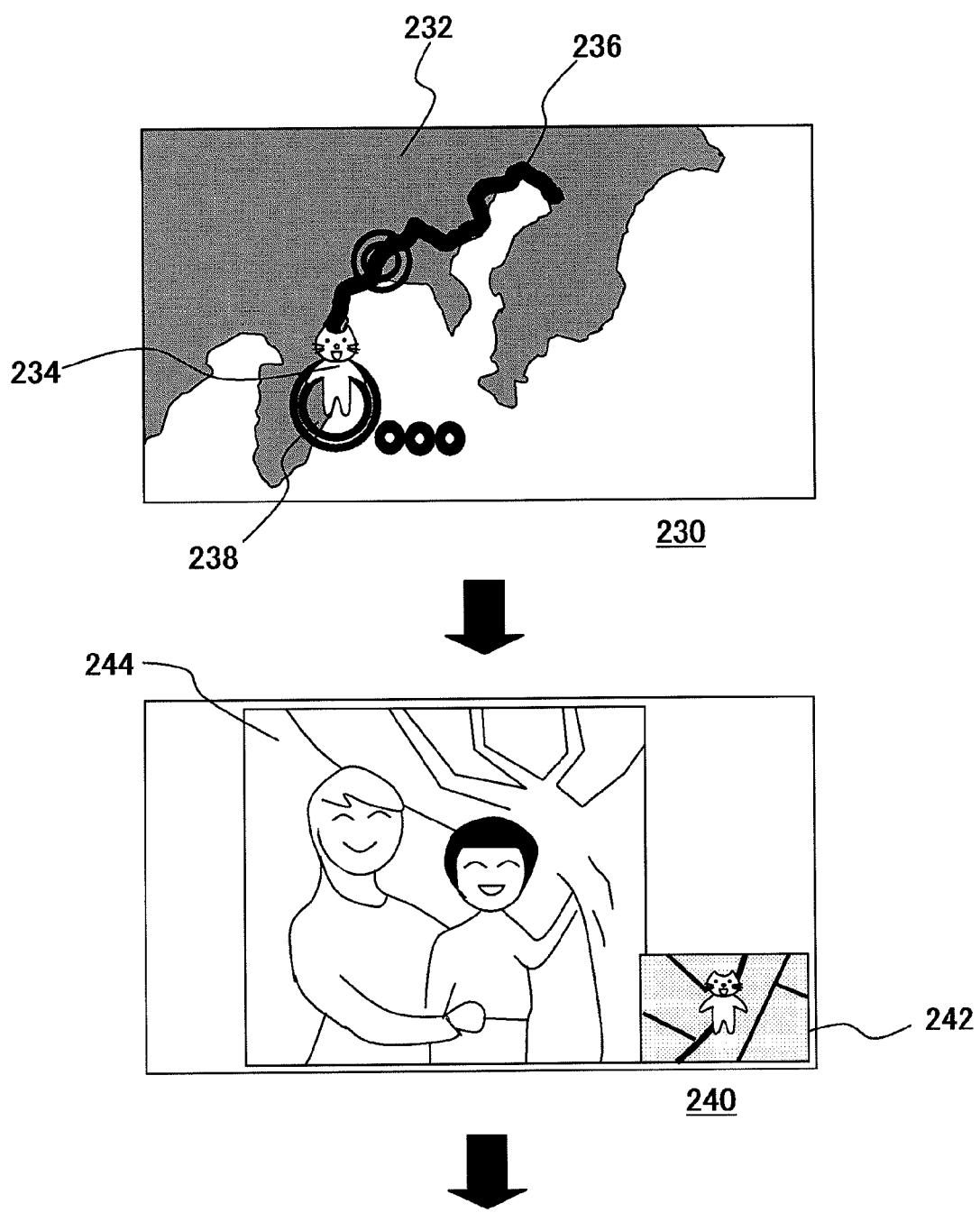
FIG. 28 shows examples of images shown in a mode where a movement history and a slideshow are displayed in synchronization according to the third embodiment.
Figure 29:
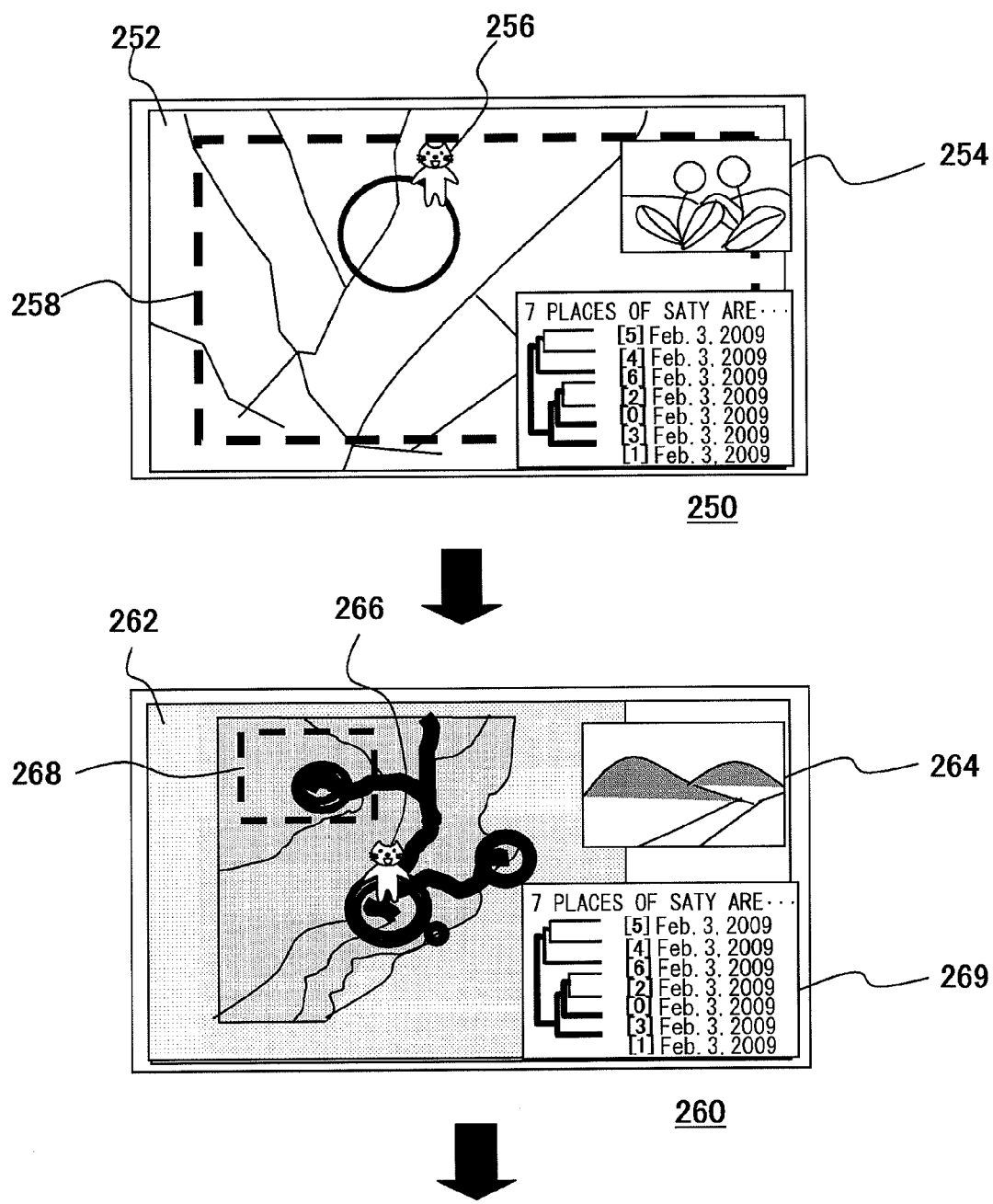
FIG. 29 shows examples of images shown in a mode where a movement history and a slideshow are displayed in synchronization according to the third embodiment.
Figure 30:
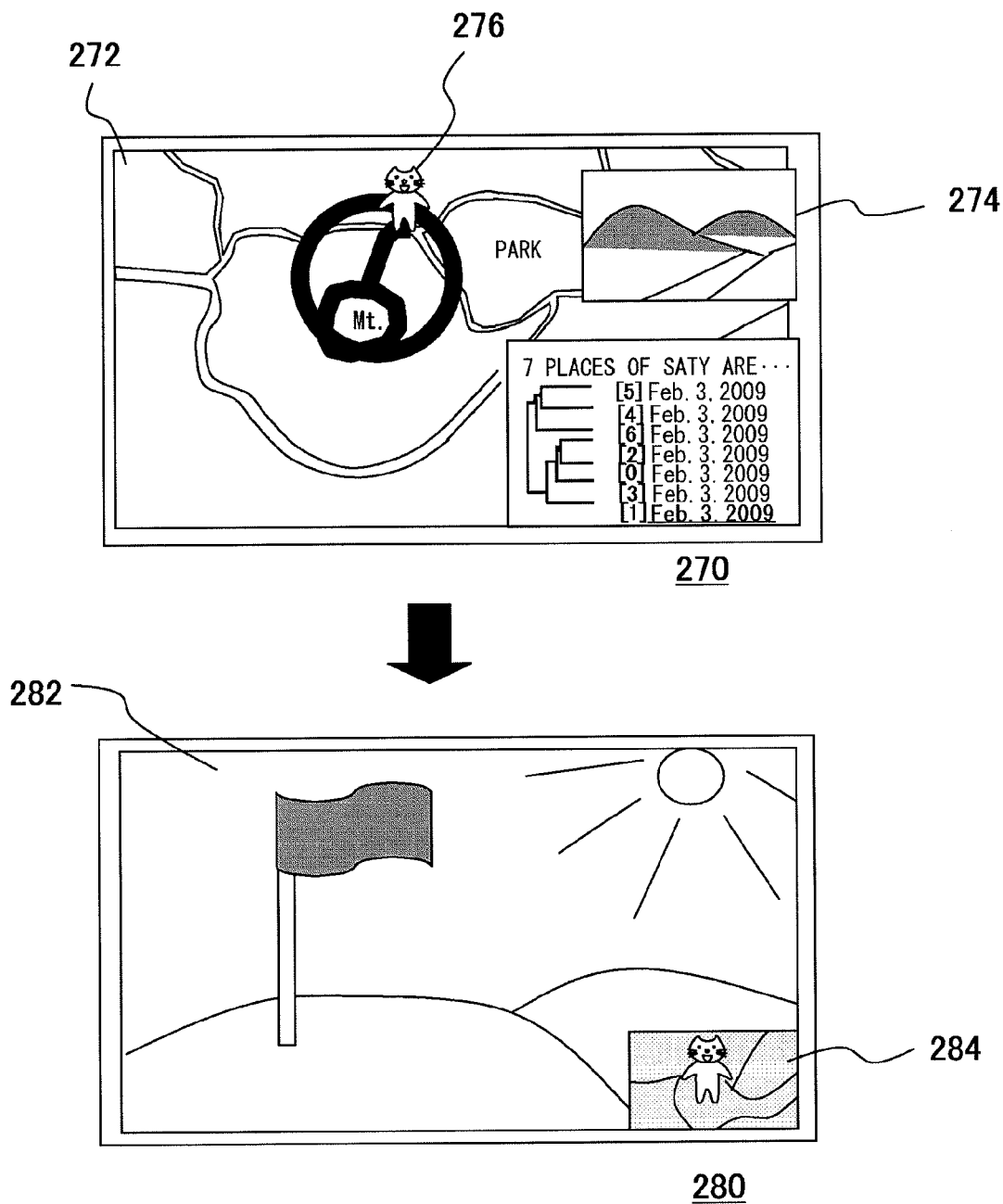
FIG. 30 shows examples of images shown in a mode where a movement history and a slideshow are displayed in synchronization according to the third embodiment.

FIGS. 28-30 show examples of images shown in a mode where a movement history and a slideshow are displayed in synchronization. Although images are actually presented as a stream of movement, the figures depict several frames extracted from the stream. The movement history used is the same as that illustrated in FIGS. 20-22 in the second embodiment. In other words, photos selected as described above from the photos taken in a single or a plurality of trips at respective locations are displayed in the slideshow format. A movement history display image 230 in the upper half of FIG. 28 shows on a map 232 a graphic form 236 representing a movement route and a graphic form 238 representing a place of stay, as described in the second embodiment. The image also shows a character 234. Unlike the character of the second embodiment, the character 234 moves based on the movement history.

Animation of the character 234 may be displayed using a known technology. The movement history display image 230 in the upper half of FIG. 28 shows the character 234 arriving at the place of stay represented by the graphic form 238 via the movement route. In the perspective of the time axis of the movement history, the character 234 has moved on the map according to the data in the first segment of movement in the movement history and arrived at the first segment of stay. When the character 234 thus arrives at a place of stay, the display is switched to a during-the-stay photo display image 240 as shown in the lower half of the figure.

The during-the-stay photo display image 240 shows a photo in a main area 244 and shows a map of the place of stay, where the character is currently located, in a smaller sub area 242. The image of the map shown corresponds to that in the leaf node in the hierarchy in the second embodiment. In the main area 244, photos selected in the corresponding segment of stay are displayed such that the photos are switched at predetermined intervals. In this way, correspondence between the place of stay and the photo is made clearly known.

When all of the selected photos are displayed, the display is switched to a during-the-movement photo display image 250 as shown in the upper half of FIG. 29. The during-the-movement photo display image 250 shows a map representing the movement history in a main area 252 and shows a photo in a sub area 254. A character 256 is also displayed on the map of the main area 252. Along the time axis of the movement history, the character 256 leaves the previous segment of stay and moves on the map in accordance with the data for the segment of movement subsequently arrived at. In the sub area 254, photos selected in the segment of movement are displayed in synchronization with the movement of the character such that the photos are switched at predetermined intervals. By determining the speed of the movement of the character 256 from the length of route in the segment of movement and the display time per a single photo, it is ensured that the traveling in the segment of movement and the display of photos end at the same time.

The map displayed in the main area 252 of the during-the-movement photo display image 250 is an image in the lowest level in a hierarchy in the second embodiment immediately after the character 256 leaves the place of stay. As the character 256 leaves the place of stay in accordance with the data for the movement history, the display is switched to the map one level higher in the hierarchy in the second embodiment. To effect such control, there is defined a boundary 258 at which the display is switched to a smaller-scale image as the character 256 moves in a direction away from the place of stay.

The boundary 258 is not actually displayed. By setting the boundary 258 at a position occurring before the character 256 disappears from the screen, as shown in the figure, the scale and display area of the image is properly switched, maintaining continuity. The image occurring after the switching is a during-the-movement photo display image 260 in the lower half of FIG. 29. Like the image 250, the image 260 shows a map representing the movement history in a main area 262 and shows a photo in a sub area 264.

The map displayed in the main area is a map higher in the hierarchy than the map shown in the during-the-movement photo display image 250. To let the user know the hierarchy, a dendrogram 269 such as that shown in the second embodiment may additionally be shown. As in the during-the-movement photo display image 250, a character 266 moves on the movement route with the passage of time. Associated with this, the photos displayed in the sub area 264 are switched. In this way, the landscape of the route where the character is moving is displayed to give a true-to-experience view. Even if there are not enough photos taken, smooth presentation is possible by including photos showing the landscape of the place and acquired from information provider server 8 in the display.

When the character 266 approaches the next place of stay, the display is switched to the map in lowest level in the hierarchy and corresponding to the place of stay. To effect such control, there is defined a boundary 268 at which the display is switched to a larger-scale image as the character 266 moves in a direction approaching the place of stay. The boundary 268 is not actually displayed, either. By switching the display to an image lower in the hierarchy described in the second embodiment when the character 266 crosses the boundary, an image of a proper scale and display area is easily displayed, maintaining continuity.

The image occurring after the switching is a during-the-movement photo display image 270 in the upper half of FIG. 30. Like the image 260, the image 270 shows a map representing the movement history in a main area 272 and shows a photo in a sub area 274. When the character 276 enters the place of stay, a segment of movement in the movement history ends. At this point of time, all of the photos selected in the segment of movement have been displayed. A during-the-stay photo display screen 280 in the lower half of FIG. 30 is then displayed. Like the during-the-stay display image 240 in the lower half of FIG. 28, the during-the-stay photo display image 280 shows a photo in a main area 282 and shows a map of the place of stay in a sub area 284. In the main area 282, photos selected in the corresponding segment of stay are displayed such that the photos are switched at predetermined intervals.

By repeating the above processes for all segments of movement and segments of stay in the movement history, a slideshow synchronized with the movement of the character indicating a place on a map is presented. In this way, photos can be displayed in a balanced manner in association with individual acts (e.g., stay, movement) in an event such as a trip conducted over a duration of time.

In the case of an event such as a trip, however, the frequency of taking photos is often reduced on a return trip. In such a case, there may be not be enough contents for display as the slideshow nears its end. To address this, a predetermined number of photos summarizing the entire trip may be used to continue the slideshow when the character has completed the entire route. Photos displayed in this case may be selected independently of the photos displayed along with the character in the main part of the slideshow.

The same algorithm may be used for selection. For example, photos to summarize the trip may be selected in a balanced manner by configuring the total number of photos N_all to be smaller than the main part of the slideshow. Alternatively, photos may be selected in a condition suitable for the purpose of summary. For example, results of facial detection may be used to categorize the photos into photos not showing faces, photos showing only one face, photos showing two faces, . . . so that a predetermined number of photos are selected from each category based on a determination as to the level of visual beauty. The condition for selection may be user adjustable. In categorizing the photos according to the number of faces captured, photos capturing a larger number of persons than the number of persons in the family may be excluded from the summary, by configuring the maximum number of faces in the selected photos to be the number of persons in the family. By this way, unity of the slideshow can be realized.

All of the examples above are directed to still photos. However, the inventive approach is also applicable to data evolving over time (e.g., sound and movies). In this case, the number of photos displayed in each segment is replaced by the length of a movie or sound. Data of a length determined for each segment is extracted from the start of the data or from the middle of the data. Sound and movies adapted to stays and movements can be presented by outputting the data thus extracted along with the character moving on the map. Photos, sound, and movies may be used in combination. For example, the display may be switched between photos and movies depending on the segment, or sound may be attached to the slideshow. Other than photos, computer graphics, hand-drawn pictures captured by a scanner, text data such as lyrics and memos may be shown.

According to this embodiment described above, photos selected from those taken in an event for which a position history is recorded are displayed as a slideshow. In this process, the number of photos displayed is defined for each segment based on the relative duration of segments of movement and segments of stay in a movement history derived from a position history, the number of photos taken in each segment, the relative number of photos to be displayed in segments of movement and segments of stay. Photos are selected accordingly. In this way, photos can be selected to reflect actual situations of individual acts, namely, stays and movements.

For selection of photos, facial recognition technology is introduced so that photos are not only categorized into portraits and non-portraits, but the relative area of a face captured and the number of persons captured are identified and used as criteria for selection. By defining the ratio between portraits and non-portraits in advance, it is ensured that a wide variation of photos is selected. Information attached to photos may also be used as criteria for selection. By evaluating photos from a variety of angles, precision in predicting photos desirable for display is improved. This can allow the display of a slideshow that is not biased or jumpy and that truly reflects the situations of events (e.g., events in a trip) even if the total display time is limited.

Since photos are selected based on a movement history, association between photos and movement history information can be easily established. This can be taken advantage of to achieve a method of presentation where photos are displayed in synchronization with the movement of a character moving on a map according to a movement history. By controlling the movement of the display area on a map and the switching of photos simultaneously according to a proper timing schedule, a novel, true-to-experience presentation that does not fit the category of mere slideshows can be presented.

Described above is an explanation based on an exemplary embodiment. The embodiment is intended to be illustrative only and it will be obvious to those skilled in the art that various modifications to constituting elements and processes could be developed and that such modifications are also within the scope of the present invention.

In the embodiments described above, a position history represents data where position coordinates are recorded at predetermined time intervals. Alternatively, time intervals may not be constant so long as the information used as a position history maps points of time into positions. For example, a movement history can be similarly acquired by using information on recorded time and recorded position recorded as additional information when data is recorded in a camera, video camera, voice recorder, or personal digital assistant (PDA).

In the third embodiment, the speed obtained by finding time-dependent change in position coordinates is referred to in order to organize time into segments from which to select contents, namely, into segments of stay and segments of movement. Alternatively, any data may be used for segmentation so long as time is properly segmented. For example, the user may carry with himself or herself a portable device provided with a pulse meter so that contents are acquired accordingly. Time-dependent change in the pulse is referred to in order to organize time into time segments when the pulse exceeds a predetermined threshold value and time segments when the pulse is the threshold value or below.

What is claimed is:

1. An information processing apparatus comprising:
a categorization unit configured to determine time-dependent change of a parameter indicating a speed by referring to a position history containing a record of position coordinates of a subject recorded in association with time, and to organize a time axis into a segment of stay and a segment of movement by extracting, as a period of stay, a time period when the speed of the subject is below a predetermined speed threshold value for a period of time equal to or more than a predetermined duration threshold value;
a place of stay identification unit configured to identify a plurality of segments of stay identified as indicating stays at the same place, by referring to a plurality of segments of stay identified by the categorization unit and detecting those segments of stay where the distribution of position coordinates in one segment of stay overlaps the distribution of position coordinates in the other segments of stay, sharing a predetermined portion of respective areas or larger, and also configured to identify positions of places of stay corresponding to the segments of stay by referring to the distribution of position coordinates;
a movement history generation unit configured to generate movement history information that maps the positions of the places of stay identified by the place of stay identification unit into the corresponding segments of stay on the time axis; and
a behavioral information generation unit configured to visualize the movement history information generated by the movement history information generation unit.

2. The information processing apparatus according to claim 1,
wherein the categorization unit generates a plurality of categorization patterns corresponding to respective speed threshold values, by extracting segments of stay using a plurality of speed threshold values,
the movement history generation unit generates movement history information for each categorization pattern, and
the behavioral information generation unit presents a plurality of items of information with different abstraction levels of places of stay, by switching the visualized movement history information in accordance with an input requesting switching.

3. The information processing apparatus according to claim 2,
wherein the behavioral information generation unit displays on a map a position of the place of stay and a movement route connecting the position coordinates recorded in the segment of movement defined by the movement history information, and switches the movement history information used in the display according to a scale of the map.

4. The information processing apparatus according to claim 3,
wherein the behavioral information generation unit varies a size of a graphic form representing a position of the place of stay according to a length of time of stay in the place of stay.

5. The information processing apparatus according to claim 3,
wherein the behavioral information generation unit presents a frequency of visits in the place of stay based on the number of segments of stay in the same place of stay including in the movement history information.

6. The information processing apparatus according to claim 2,
wherein the categorization unit applies the speed threshold value used in threshold-based determination for extraction of a segment of stay in the descending order of the plurality of speed threshold values, and subjects a segment of stay extracted using a previous speed threshold value to threshold-based determination using the next speed threshold value.

7. The information processing apparatus according to claim 1, further comprising:
a merge unit configured to refer to the plurality of segments of stay identified by the place of stay identifying unit as indicating stays at the same place so as to merge a plurality of segments of stay that do not sandwich segments of stay in other places on the time axis and a segment of movement sandwiched by the plurality of segments of stay into a single segment of stay, and also configured to reflect the merge in the movement history information.

8. The information processing apparatus according to claim 7,
wherein the merge unit acknowledges user designation of a plurality of segments of stay that are among the plurality of segments of stay identified by the place of stay identification unit as indicating stays at the same place and that should be merged into a single segment of stay, and reflects the merge of the segments of stay thus designated and a segment of movement sandwiched thereby in the movement history information.

9. The information processing apparatus according to claim 1,
wherein the movement history generation unit includes in the movement history information a value obtained by dividing the number of photos that can be acquired from a server connected via a network based on a position of the place of stay included in the movement history information and that are mapped into the place, by an area of the place of stay obtained from the distribution of position coordinates in the corresponding segment of stay, the included value representing a score of interest.

10. The information processing apparatus according to claim 1,
wherein the place of stay identification unit derives an ellipse encompassing all position coordinates in each segment of stay so as to approximate the distribution of position coordinates by the ellipse to detect the overlap.

11. The information processing apparatus according to claim 1, further comprising:
a search unit configured to use information related to a place as a search key and to search a plurality of items of the movement history information for the movement history information that matches a condition derived from the search key,
wherein the behavioral information generation unit also visualizes the movement history information extracted by the search unit as a search result in a predetermined format.

12. An information processing method comprising:
reading from a memory a position history containing a record of position coordinates of a subject recorded in association with time so as to determine time-dependent change of a parameter indicating a speed;

referring to the change in the speed and organizing a time axis into a segment of stay and a segment of movement by extracting, as a period of stay, a time period when the speed of the subject is below a predetermined speed threshold value for a period of time equal to or more than a predetermined duration threshold value;

identifying a plurality of segments of stay identified as indicating stays at the same place, by referring to a plurality of segments of stay and detecting those segments of stay where the distribution of position coordinates in one segment of stay overlaps the distribution of position coordinates in the other segments of stay, sharing a predetermined portion of respective areas or larger, and also identifying positions of places of stay corresponding to segments of stay by referring to the distribution of position coordinates;

generating movement history information that maps identified the positions of the places of stay into the corresponding segments of stay on the time axis, and storing the information in a memory; and visualizing the movement history information and outputting the visualized information to an output device.

13. A computer program embedded in a computer readable medium, comprising:

a module configured to read from a memory a position history containing a record of position coordinates of a subject recorded in association with time so as to determine time-dependent change of a parameter indicating a speed;

a module configured to refer to the change in the speed and organize a time axis into a segment of stay and a segment of movement by extracting, as a period of stay, a time period when the speed of the subject is below a predetermined speed threshold value for a period of time equal to or more than a predetermined duration threshold value;

a module configured to identify a plurality of segments of stay identified as indicating stays at the same place, by referring to a plurality of segments of stay and detecting those segments of stay where the distribution of position coordinates in one segment of stay overlaps the distribution of position coordinates in the other segments of stay, sharing a predetermined portion of respective areas or larger, and to identify positions of places of stay corresponding to the segments of stay by referring to the distribution of position coordinates;

a module configured to generate movement history information that maps identified the positions of the places of stay into the corresponding segments of stay on the time axis, and to store the information in a memory; and a module configured to visualize the movement history information and to output the visualized information to an output device.

14. A computer readable recording medium having embedded therein a computer program comprising:

a module configured to read from a memory a position history containing a record of position coordinates of a subject recorded in association with time so as to determine time-dependent change of a parameter indicating a speed;

a module configured to refer to the change in the speed and organize a time axis into a segment of stay and a segment of movement by extracting, as a period of stay, a time period when the speed of the subject is below a predetermined speed threshold value for a period of time equal to or more than a predetermined duration threshold value;

a module configured to identify a plurality of segments of stay identified as indicating stays at the same place, by referring to a plurality of segments of stay and detecting those segments of stay where the distribution of position coordinates in one segment of stay overlaps the distribution of position coordinates in the other segments of stay, sharing a predetermined portion of respective areas or larger, and to identify positions of places of stay corresponding to the segments of stay by referring to the distribution of position coordinates;

a module configured to generate movement history information that maps identified the positions of the places of stay into the corresponding segments of stay on the time axis, and to store the information in a memory; and a module configured to visualize the movement history information and to output the visualized information to an output device.

* * * * *